US008176052B2

(12) United States Patent
Inouye et al.

(10) Patent No.: US 8,176,052 B2
(45) Date of Patent: *May 8, 2012

(54) HYPERSPACE INDEX

(75) Inventors: Dillion Inouye, Provo, UT (US); Jeanne Inouye, legal representative, Provo, UT (US); Ronald P. Millett, Cedar Hills, UT (US); John C. Higgins, Orem, UT (US)

(73) Assignee: Perfect Search Corporation, Orem, UT (US)

( * ) Notice: Subject to any disclaimer, the term of this patent is extended or adjusted under 35 U.S.C. 154(b) by 524 days.

This patent is subject to a terminal disclaimer.

(21) Appl. No.: 12/281,262

(22) PCT Filed: Mar. 2, 2007

(86) PCT No.: PCT/US2007/063218
§ 371 (c)(1),
(2), (4) Date: Jun. 10, 2009

(87) PCT Pub. No.: WO2007/103815
PCT Pub. Date: Sep. 13, 2007

(65) Prior Publication Data
US 2009/0307184 A1     Dec. 10, 2009

Related U.S. Application Data

(60) Provisional application No. 60/779,214, filed on Mar. 3, 2006.

(51) Int. Cl.
*G06F 17/30* (2006.01)

(52) U.S. Cl. . 707/741; 707/696; 707/803; 707/E17.002; 707/E17.017; 707/E17.053

(58) Field of Classification Search ........... 707/999.002, 707/999.003, 999.005, 690, 741, 803, 713, 707/715, 999.006, E17.002, E17.017, E17.053, 707/696
See application file for complete search history.

(56) References Cited

U.S. PATENT DOCUMENTS
4,817,036 A * 3/1989 Millett et al. .......................... 1/1
(Continued)

FOREIGN PATENT DOCUMENTS
WO      WO02/10967      2/2002

OTHER PUBLICATIONS

Roblee, Chris, "Hierarchical Bloom Filters: Accelerating Flow Queries and Analysis", Lawrence Livermore National Laboratory FloCon 2008, dated Jan. 8, 2008.

(Continued)

*Primary Examiner* — Tim T Vo
*Assistant Examiner* — Shiow-Jy Fan
(74) *Attorney, Agent, or Firm* — Workman Nydegger

(57) ABSTRACT

Hyperspace index data structure. A data structure indexes identifiers corresponding to parameter patterns. The presence of an identifier in the data structure indicates that the corresponding parameter pattern may be present in a set of parameter patterns, while absence of the indicator can be used to indicate that the corresponding parameter pattern is not present. The data structure includes a first field which includes binary bits or groups of small parameter pattern keyed records. Each binary bit or parameter pattern keyed record corresponds to an identifier corresponding to a parameter pattern. If the bit or record corresponding to the identifier is set or present, the identifier is included in the first field. One or more additional fields are hierarchically below the first data field. Each of the additional fields includes identifiers for a subset of information in the first field. The absence of an identifier corresponding to a parameter pattern at any level in all of the hierarchical threads indicates that the parameter pattern is not present.

29 Claims, 6 Drawing Sheets

U.S. PATENT DOCUMENTS

| | | | |
|---|---|---|---|
| 4,961,139 A | 10/1990 | Hong et al. | |
| 5,530,854 A | 6/1996 | Emery et al. | |
| 5,664,179 A | 9/1997 | Tucker | |
| 5,699,441 A | 12/1997 | Sagawa | |
| 5,701,459 A | 12/1997 | Millett et al. | |
| 5,737,734 A | 4/1998 | Schultz | |
| 5,740,445 A | 4/1998 | Okuda | |
| 5,761,652 A | 6/1998 | Wu et al. | |
| 5,799,312 A | 8/1998 | Rigoutsos | |
| 6,018,733 A | 1/2000 | Kirsch et al. | |
| 6,026,398 A | 2/2000 | Brown et al. | |
| 6,070,164 A * | 5/2000 | Vagnozzi | 1/1 |
| 6,076,051 A | 6/2000 | Messerly | |
| 6,128,613 A | 10/2000 | Wong et al. | |
| 6,216,123 B1 | 4/2001 | Robertson et al. | |
| 6,233,571 B1 | 5/2001 | Egger et al. | |
| 6,253,188 B1 | 6/2001 | Witek | |
| 6,473,729 B1 | 10/2002 | Gastaldo et al. | |
| 6,516,320 B1 * | 2/2003 | Odom et al. | 707/747 |
| 6,584,458 B1 | 6/2003 | Millett et al. | |
| 6,584,465 B1 | 6/2003 | Zhu | |
| 6,658,626 B1 | 12/2003 | Aiken | |
| 6,678,686 B1 | 1/2004 | Patel | |
| 6,718,325 B1 | 4/2004 | Chandra | |
| 6,748,401 B2 | 6/2004 | Blackburn et al. | |
| 6,772,141 B1 | 8/2004 | Pratt et al. | |
| 6,778,981 B2 | 8/2004 | Lee et al. | |
| 6,785,677 B1 | 8/2004 | Fritchman | |
| 6,804,664 B1 | 10/2004 | Hartman et al. | |
| 6,938,046 B2 * | 8/2005 | Cooke et al. | 707/741 |
| 6,947,931 B1 | 9/2005 | Bass et al. | |
| 6,985,904 B1 | 1/2006 | Kaluskar et al. | |
| 6,993,533 B1 | 1/2006 | Barnes | |
| 7,139,753 B2 | 11/2006 | Bass et al. | |
| 7,181,438 B1 | 2/2007 | Szabo | |
| 7,266,553 B1 | 9/2007 | Anderson | |
| 7,296,011 B2 | 11/2007 | Chaudhuri et al. | |
| 7,328,211 B2 | 2/2008 | Bordner et al. | |
| 7,590,716 B2 | 9/2009 | Sinclair et al. | |
| 7,640,363 B2 | 12/2009 | Teodosiu | |
| 2002/0099536 A1 | 7/2002 | Bordner et al. | |
| 2002/0099685 A1 | 7/2002 | Takano | |
| 2002/0103799 A1 | 8/2002 | Bradford | |
| 2003/0191737 A1 | 10/2003 | Steele | |
| 2004/0225497 A1 | 11/2004 | Callahan | |
| 2004/0225643 A1 | 11/2004 | Alpha et al. | |
| 2004/0260694 A1 | 12/2004 | Chaudhuri et al. | |
| 2005/0022017 A1 | 1/2005 | Maufer et al. | |
| 2005/0108230 A1 | 5/2005 | Carrol | |
| 2005/0108394 A1 | 5/2005 | Braun et al. | |
| 2005/0131872 A1 | 6/2005 | Calbucci et al. | |
| 2005/0171926 A1 | 8/2005 | Thione | |
| 2005/0283468 A1 | 12/2005 | Kamvar | |
| 2006/0004740 A1 | 1/2006 | Dettinger | |
| 2006/0036649 A1 | 2/2006 | Simske et al. | |
| 2006/0080361 A1 | 4/2006 | Suzuki | |
| 2006/0106793 A1 | 5/2006 | Liang | |
| 2006/0126916 A1 | 6/2006 | Kokumai | |
| 2006/0195672 A1 | 8/2006 | Inoue | |
| 2006/0212420 A1 | 9/2006 | Murthy | |
| 2006/0235843 A1 | 10/2006 | Musgrove et al. | |
| 2006/0265396 A1 | 11/2006 | Raman | |
| 2007/0027864 A1 | 2/2007 | Collins et al. | |
| 2007/0033165 A1 | 2/2007 | Sheinwald et al. | |
| 2007/0073894 A1 | 3/2007 | Erickson et al. | |
| 2007/0088686 A1 | 4/2007 | Hurst-Hiller | |
| 2007/0106876 A1 | 5/2007 | Goswai | |
| 2007/0156677 A1 | 7/2007 | Szabo | |
| 2007/0162481 A1 | 7/2007 | Millett | |
| 2007/0175674 A1 | 8/2007 | Brinson | |
| 2007/0203898 A1 | 8/2007 | Carmona | |
| 2007/0250494 A1 | 10/2007 | Peoples et al. | |
| 2007/0294235 A1 | 12/2007 | Millett | |
| 2008/0059462 A1 | 3/2008 | Millett | |
| 2008/0154938 A1 | 6/2008 | Cheslow | |
| 2009/0019038 A1 | 1/2009 | Millett | |
| 2009/0063454 A1 | 3/2009 | Millett | |
| 2009/0063479 A1 | 3/2009 | Millett | |
| 2009/0064042 A1 | 3/2009 | Millett | |
| 2009/0319549 A1 | 12/2009 | Millett | |

OTHER PUBLICATIONS

"Using Bloom Filters"; Apr. 8, 2004; http://www.perl.com/pub/a/2004/04/08/bloom_filters.html; 4 pages.
Foundations of Statistical Natural Language Processing, The MIT Press, Cambridge Massachusetts, May 1999; pp. 151, 158, 192-194, 377 and 532.
"An Analysis of Statistical and Syntactic Phrases"; Jun. 1997.
U.S. Appl. No. 11/847,688, filed Apr. 1, 2010, Notice of Allowance.
U.S. Appl. No. 11/328,863, filed Feb. 20, 2008, Office Action.
U.S. Appl. No. 11/681,673, filed Dec. 29, 2008, Office Action.
U.S. Appl. No. 11/681,673, filed Oct. 5, 2009, Notice of Allowance.
U.S. Appl. No. 11/847,688, filed Nov. 27, 2009, Office Action.
U.S. Appl. No. 11/847,869, filed Jan. 8, 2010, Office Action.
U.S. Appl. No. 11/847,784, filed Mar. 4, 2010, Office Action.
U.S. Appl. No. 12/143,441, filed May 12, 2010, Office Action.
U.S. Appl. No. 12/211,713, filed Jan. 12, 2011, Office Action.
Office Action dated Dec. 6, 2012 cited in U.S. Appl. No. 11/847,784.
Gaede, V. et al., "Multidimensional Access Methods," ACM Computing Surveys, ACM, New York, NY, US, vol. 30, No. 2, Jun. 1, 1998, pp. 170-231.
Xu, Yu, J. et al., "Multi-Cube Compilation," Database Systems For Advanced Applications 2001 Proceedings, Seventh International Conference on Apr. 18-21, 2001, Piscataway, N.J., USA, pp. 126-133.
Shukla, A. et al., "Storage Estimation for Multidimensional Aggregates in the Presence of Hierarchies," Proceedings of the 22th International Conference on Very Large Data Bases, San Francisco, CA, USA, 1996.
"Hash Function, from Wikipedia," Internet Citation, Retrieved on Apr. 18, 2008 from http://en.wikipedia.org/wiki/hash_function.
Office action dated Jun. 25, 2009 cited in U.S. Appl. No. 11/681,673.
Notice of Allowance dated May 13, 2010 cited in U.S. Appl. No. 11/847,869.
Office action dated Aug. 19, 2010 cited in U.S. Appl. No. 11/847,784.
Notice of Allowance dated Dec. 14, 2010 cited in U.S. Appl. No. 12/143,441.

* cited by examiner

| 0 | 1 | 2 | 3 | 4 | 5 | 6 | 7 | 8 | 9 | a | B | C | D | E | F | 10 | 11 | 12 | 13 | 14 | 15 | 16 | 17 | 18 | 19 | 1a | 1b | 1c | 1d | 1e | 1f |
|---|---|---|---|---|---|---|---|---|---|---|---|---|---|---|---|----|----|----|----|----|----|----|----|----|----|----|----|----|----|----|----|
| 0 | 0 | 0 | 1 | 0 | 1 | 1 | 0 | 0 | 1 | 1 | 0 | 0 | 0 | 1 | 0 | 0  | 0  | 1  | 0  | 0  | 1  | 1  | 0  | 1  | 1  | 0  | 0  | 1  | 0  | 0  | 1  |

↑104  ↑106

|  |  |  | Hash | Last 8 bits of hash | Last 5 bits of hash | Hex of last 5 bits |
|---|---|---|---|---|---|---|
|  | | fox | 40b8636cf497235c | 01011100 | 11100 | 1C |
|  | red | | 1005919ba181728d8 | 11011000 | 11000 | 18 |
|  | red | fox | f9d6824a13b3ed25 | 00100101 | 00101 | 5 |
| quick | | | b249f6d0e2e948fc | 11111100 | 11100 | 1C |
| quick | | fox | ec45e8c4c06bed36 | 00110110 | 10110 | 16 |
| quick | red | | b0cc990de2fd626d | 01101101 | 01101 | D |
| quick | red | fox | 1c1539fdf2306635 | 00110101 | 10101 | 15 |
| The | | | 1a6a89be20908b63 | 01100011 | 00011 | 3 |
| The | | fox | 679e70ee245a112d | 00101101 | 01101 | D |
| The | red | | 0ffc1785181760df | 11011111 | 11111 | 1F |
| The | red | fox | 56cf1314b42ff1d1 | 11010001 | 10001 | 11 |
| The | quick | | 00bf1348c0e 06f58 | 01011000 | 11000 | 18 |
| The | quick | fox | 272dc1de87ccca95 | 10010101 | 10101 | 15 |
| The | quick | red | fe417685c0f445c9 | 11001001 | 01001 | 9 |
| The | quick | red | e6305123b5974196 | 10010110 | 10110 | 16 |

110  112  114  116  118

300

300

| L5 | L4 | L3 | L2 | L1 | L0 |
|---|---|---|---|---|---|
| *John*<br>311<br>f=10<br>c=11<br>*Grace*<br>14c1<br>f=1<br>c=10<br>sc=Record 0<br>*b. 1917*<br>1d3<br>f=5<br>c=11<br>*d. 2000*<br>1de0<br>f=1<br>c=10<br>sc=Record 6<br><br>*302* | 311<br>f=6<br>c=01<br>4c1<br>f=1<br>c=10<br>1d3<br>f=4<br>c=01<br>de0<br>f=1<br>c=10<br><br>*304*<br><br><br>311<br>f=4<br>c=11<br>1d3<br>f=1<br>c=01<br>sc=Record 18<br><br>*306* | 4c1<br>f=1<br>c=10<br>5e0<br>f=1<br>c=01<br><br>*308*<br><br>311<br>f=6<br>c=11<br>1d3<br>f=4<br>c=11<br><br>*310* | c1<br>f=1<br>c=10<br><br>*312*<br><br>1e0<br>f=1<br>c=01<br><br>*314*<br><br>311<br>f=2<br>c=01<br>1d3<br>f=1<br>c=01<br>sc=Record 11<br>*316*<br><br>311<br>f=4<br>c=11<br>1d3<br>f=3<br>c=11<br>*318* | c1<br>f=1<br>c=10<br><br><br><br><br><br><br>1e0<br>f=1<br>c=10<br><br><br><br>111<br>f=2<br>c=11<br>1d3<br>f=1<br>c=01<br>111<br>f=2<br>c=11<br>1d3<br>f=2<br>c=11<br>111<br>f=2<br>c=11<br>1d3<br>f=1<br>c=10<br>111<br>f=2<br>c=11<br>111<br>f=2<br>c=11<br>1d3<br>f=1<br>c=10 | c1 ⟵ 328<br><br><br><br><br><br><br>e0<br><br><br><br><br><br>11<br>11,d3<br>11,d3<br>11,d3<br>11<br>11<br>11<br>11,d3<br>11 |

| Record Number | Name | Birth | Death |
|---|---|---|---|
| 0 | Grace Muzzey | 1902 | 1975 |
| 1 | Rhea Villancourt | 1905 | 1994 |
| 2 | George Crosby | 1908 | 1975 |
| 3 | Margaret Lanouette | 1907 | 1987 |
| 4 | William McHugh | 1896 | 1968 |
| 5 | Mamie Curtice | 1890 | 1976 |
| 6 | Ruth M. Colby | 1906 | 2000 |
| 7 | Eloi St. Germaine | 1903 | 1988 |
| 8 | Wilson Benner | 1918 | 1975 |
| 9 | Earl Rand | 1897 | 1964 |
| 10 | John Kennedy | 1898 | 1963 |
| 11 | John Kennedy | 1917 | 1976 |
| 12 | John Kennedy | 1917 | 1981 |
| 13 | John J. Kennedy | 1917 | 2003 |
| 14 | John Kennedy | 1917 | 1978 |
| 15 | John Kennedy | 1879 | 1963 |
| 16 | John Kennedy | 1891 | 1963 |
| 17 | John Kennedy | 1885 | 1963 |
| 18 | John Kennedy | 1917 | 1975 |
| 19 | John Kennedy | 1903 | 1963 |

FIG. 3A
*(Cont.)*

HYPERSPACE INDEX

BACKGROUND OF THE INVENTION

Computers and computing systems have affected nearly every aspect of modern living. Computers are generally involved in work, recreation, healthcare, transportation, entertainment, household management, etc. With the widespread access to computers, and the involvement of computing resources in so many aspects of modern living, large amounts of digital data continue to be generated. Because computer storage is so cheap, a large portion of this digital data continues to persist for a significant amount of time. In fact, some have estimated that the collective repository of digital data is growing at an exponential rate.

Although the computing processes required to store and retrieve electronic documents are well known, the sheer volume of documents and data stored in some databases can still make it difficult to properly index and find the desired content in a timely fashion. This is particularly true when considering that many databases contain documents with similar or identical content, thereby increasing the difficulty and processing required to distinguish among the various documents.

To facilitate the retrieval of electronic content from a database, several types of search engines and indexes have been developed. Initially, traditional databases were developed with fields of information that could only be searched through a rigid alphabetically ordering of associated fields, such as a last name field. Later, full text indexing was developed to provide greater searching flexibility. With a full text index all words are indexed and can therefore be searched for within a document or record. With full text indexing, it is also possible to simultaneously or sequentially search for a plurality of search terms within the indexed documents and to hopefully improve the accuracy of a search. This is done by searching for each of the individual terms and then reporting intersecting results as appropriate as well as term proximity to other terms or other factors that affect the relevance of the search.

While full text indexing and modified field indexing have provided significant improvements over traditional indexes that only permitted rigid alphabetical searching of fields, there is still a significant need for improvement in searching technology. This is true, not only for Internet and traditional databases, but for any computing process or application in which data is retrieved from a repository of any type.

Bottlenecks that slow down the searching processes, for example, can be created by the limitations of computer hardware and connections. In particular, computer processors are limited in the number of calculations per time unit (e.g. calculations per second) that can be performed. Networks are also limited in the amount of data per time unit that can be transmitted across the network. Even storage devices are limited by the number of I/O operations that can be performed within a given time. Memory devices are also limited in the amount of information that can be stored at a given time. To overcome these bottlenecks, typically search services have simply thrown more resources at the bottleneck. For example, more computers, with additional memory and hard drive storage, and faster I/O processing may be used to solve the problem of increasing digital data. However, if digital data grows exponentially, under current methods of dealing with searching, the amount of hardware that would need to be added to account for the new digital data would also likely grow exponentially.

Existing searching paradigms continue to be constrained by the philosophical approaches after which they were modeled. For example, existing search paradigms are designed to perform searching on demand or on-the-fly, only after the search query has been received. While this approach is somewhat logical, because it is unknown what to search for before the query is received, this approach delays computationally expensive processing which is noticeable to the consumer.

Existing philosophical approaches to searching also require a significant amount of irrelevant processes to ensure that the search is comprehensive. In effect, the existing searching techniques require a very deliberate and sequential sweep of the data repositories that are being searched, by looking in every 'nook and cranny', if you will, to help ensure the search is comprehensive. This blanket searching, however, wastes a lot of processing time and expense looking for the data in places were the data is unlikely to be found. However, because the existing searching techniques are directed to identifying where the data is, they may fail to appreciate the value of knowing where the data is not.

Additionally, there is a large cost for getting records or documents that contain a number of search terms combined in various ways. For example, a user may request a search that specifies exact phrases including several different terms, or Boolean combinations of terms in a document. Typically, present indexing schemes invest a significant amount of time and processing power merging together long lists and determining how the relevant order is to be given to the intersection of the set. The most relevant document may be the last document in the data base and it may contain the most difficult to process kind of search query. This may require the intersection and relevance evaluation on all the references of all the search terms even if only the top five hits are being requested.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

One embodiment may be embodied as a data structure in a computing environment. The data structure indexes identifiers. The identifiers correspond to parameter patterns. A parameter pattern can be, for example, a single word, an exact phrase, words close to each other by various proximity measures, both in order and out of order, phonetic, syntactic and semantic patterns, data base field combinations, text formatting, text location (e.g. "header") and overall document or record relevance measures. The presence of an identifier in the data structure indicates that the corresponding parameter pattern may be present in a set of parameter patterns, such as in a data space front ended by the data structure. Absence of the indicator in the data structure can be used to indicate that the corresponding parameter pattern is not present in the set of parameter patterns. The data structure includes a first field. The first field includes a number of binary bits or small parameter pattern records. Each binary bit or small parameter pattern record corresponds to a possible identifier corresponding to a parameter pattern from among a set of parameter patterns. If the bit corresponding to the identifier is set or the identifier's small parameter pattern record exists, the identifier is included in the first field. The data structure further includes one or more additional fields hierarchically below the first data field. Each of the additional fields includes at least one of identifiers for a subset of the set of parameter patterns represented by identifiers in the first field, identifiers for a parameter pattern related to one or more of the parameter patterns in the set of parameter patterns or a subset of parameter patterns or related parameter patterns represented by one of the other one or more additional fields hierarchically above the field including the identifiers. The absence of an identifier corresponding to a parameter pattern for a particular field indicates that the parameter pattern is not represented by an indicator in fields hierarchically below the field irrespective of the presence of identifiers corresponding to the parameter pattern being present fields hierarchically above the field not including an identifier corresponding to the parameter pattern. The absence of an identifier corresponding to a parameter pattern at any level in all of the hierarchical threads indicates that the parameter pattern is not present in the set of parameter patterns.

Another embodiment includes a method for indexing identifiers into a data structure where the identifiers correspond to parameter patterns. As in the previous example, the presence of an identifier in the data structure indicates that the corresponding parameter pattern may be present in a set of parameter patterns. Absence of the identifier in the data structure can be used to indicate that the corresponding parameter pattern is not present in the set of parameter patterns. The method includes including a first field identifier for a first parameter in a first field. The first field includes a number of binary bits or small parameter pattern records. Each binary bit or small parameter pattern record corresponds to a possible identifier corresponding to a parameter pattern from among a set of parameter patterns. When the bit is set, or the identifier's small parameter pattern record exists, the identifier is included in the first field. The method further includes including one or more lower field identifiers for the first parameter pattern or a parameter pattern related to the first parameter pattern in one or more additional fields hierarchically below the first data field. Each of the additional fields includes at least one of the identifiers for a subset of the set of parameter patterns represented by identifiers in the first field, identifiers for a parameter pattern related to one or more of the parameter patterns in the set of parameter patterns or a subset of parameter patterns or related parameter patterns represented by one of the other one or more additional fields hierarchically above the field including the identifiers.

Yet another embodiment includes a method of locating identifiers in an index. As in the previous examples, the identifiers correspond to parameter patterns, where the presence of an identifier in the data structure indicates that the corresponding parameter pattern may be present in a set of parameter patterns, and where absence of the indicator in the data structure can be used to indicate that the corresponding parameter pattern is not present in the set of parameter patterns. The method includes referencing a first field for a first identifier corresponding to a first parameter pattern. The first field includes a number of binary bits or small parameter pattern records, each binary bit or small parameter pattern record corresponding to a possible identifier corresponding to a parameter pattern from among a set of parameter patterns. When the bit is set or the identifier's small pattern record exists, the identifier is included in the first field. If the first identifier is in the first field, the method further includes referencing one or more additional fields hierarchically below the first field for one or more identifiers corresponding to the parameter pattern or one or more related parameter patterns. Each of the additional fields includes at least one of identifiers for a subset of the set of parameter patterns represented by identifiers in the first field, identifiers for a parameter pattern related to one or more of the parameter patterns in the set of parameter patterns or a subset of parameter patterns or related parameter patterns represented by one of the other one or more additional fields hierarchically above the field including the identifiers. The absence of an identifier corresponding to a parameter pattern for a particular field indicates that the parameter pattern is not represented by an indicator in fields hierarchically below the field irrespective of the presence of identifiers corresponding to the parameter pattern being present fields hierarchically above the field not including an identifier corresponding to the parameter pattern. The absence of an identifier corresponding to a parameter pattern in at least one field for each of the hierarchical threads indicates that the parameter pattern is not present in the set of parameter patterns.

These and other features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 1 illustrates an abbreviated index, one of many data structures that may be used to implement the hyperspace index;

FIG. 3A illustrates table view of portions of a hyperspace index;

DETAILED DESCRIPTION OF THE INVENTION

Figure 2:
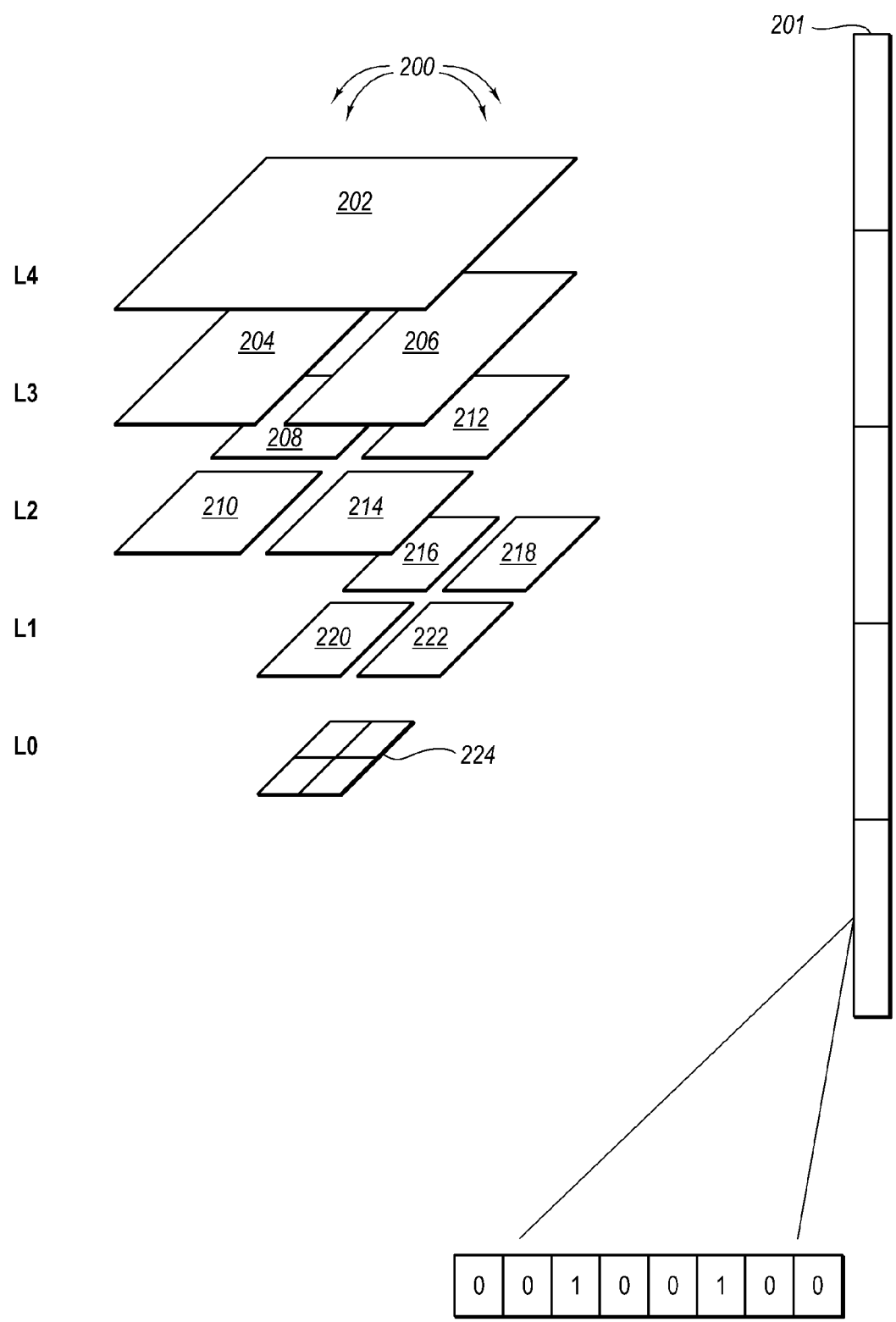
FIG. 2 illustrates a hyperspace index including a top level abbreviated index, and sub level abbreviated indexes that slice (horizontal levels) and dice (vertical rows) information in the top level abbreviated index.

The present application illustrates a number of techniques which can be used to increase search efficiency. In one example embodiment that should in nowise be construed as limiting of every embodiment, extremely fast search times can be achieved by combining a number of the techniques disclosed herein. For example in one embodiment, the combined effect of abbreviated indexing, pattern-auto alignment and terminating a search early due to confirmation that a parameter pattern is not included in the abbreviated index or due to a certain relevance or percentage being searched, can provide for extremely fast searches. Abbreviated indexing includes techniques for indexing parameter patterns using bits of a memory location, where the memory location address represents the parameter pattern and the bits represents the presence or at least possible presence of a parameter pattern in a data store. Pattern-auto alignment is a technique described in more detail below which allows the parameter patterns to be organized in the memory locations in an order that allows fast look-up in the memory. Early termination is a technique that allows a search of the abbreviated index to be terminated when it is certain that a parameter pattern is not represented in the abbreviated index, when a certain percentage of the index has been searched, when a certain portion of relevant entries in the abbreviated index have been searched, etc. The early termination feature can be enhanced as described below by careful organization of the abbreviated index to facilitate, for example, most relevant searching first.

Provisional patent application 60/779,214, titled Abbreviated Index, which is incorporated herein by reference, describes an abbreviated index using values derived from hashing search parameters, or otherwise generating identifiers, to index the possible existence of parameter patterns in a database. Many of the principles illustrated in that application, including methods of hashing, methods of creating an abbreviated index, methods of creating parameter patterns, and the like can be used in the embodiments described herein. The reader's attention is directed to FIG. 1 and the following description, which is a general description of the abbreviated index previously disclosed.

Referring now to FIG. 1, an abbreviated index 102 is illustrated, which in this example is a 32 bit binary number. The abbreviated index 102, which comprises one example of a pre-filter index, may be embodied on computer readable media. In one embodiment, the abbreviated index 102 may be embodied on physical memory in a computer system. The abbreviated index 102 is shown with an index field 104 and a value field 106. Notably, the index field 104 in this example is shown for convenience of explanation. The value field 106, in this example, includes the 32 bit binary number stored in physical memory. The index field 104 includes hexadecimal index representations of each of the elements of the 32 bit number represented in the value field 106.

FIG. 1 further illustrates a numerical representation table 108. The numerical representation table 108 includes a parameter patterns field 110, a numerical representation field 112, a last 8 bits field 114, a last 5 bits field 116, and a hex of the last 5 bits field 118.

The parameter patterns field 110 includes parameters and patterns of parameters on which operations can be performed. In this example, a data structure includes the text phrase "The quick red fox." In the example shown, combinations of individual words are represented as parameter patterns in the parameter patterns field 110. For example, "fox" is illustrated as a parameter pattern. "red" is illustrated as a second parameter pattern. "red fox" is illustrated as a parameter pattern. And so forth. The example shown here shows in the parameter patterns field 110 all possible combinations of individual words in the phrase "The quick red fox" when ordered in the original ordering.

It should be appreciated, however, that parameter patterns may also be created to represent different orderings and combinations. For example, other embodiments may include parameter patterns such as "fox quick red." This pattern with the terms in simple alphabetical order without function words may be used to perform searches when correct ordering of search terms is not necessarily needed or to increase the confidence that a particular set of search terms are present in a database. Further still, other parameter patterns may be included as illustrated in other examples illustrated herein below. Other types of patterns that can be applied to the abbreviated index or other index embodiments include, but are not limited to synonyms, homonyms, term attributes, proximities, term order, frequency, location, partial or incomplete terms, customized descriptions, related terms, phonetic, syntactic or semantic linguistic descriptions and so forth. Further still, parameter patterns may include repeats or different versions of a previously used parameter pattern for cases where the implementation uses a structure such as an abbreviated pattern index.

In this example, the parameter patterns field 110 represents search strings that may be performed to locate elements in a database, such as a database including the phrase "The quick red fox."

The numerical representation field 112 in this example includes a numerical representation of each of the parameter patterns in the parameter patterns field 110. The numerical representations may be generated in any suitable fashion. In this particular example the numerical representations are hash values of the parameter patterns. For example, a hash calculation may be performed for the parameter "fox." This hash calculation results in a number, which in this example is represented as a 64 bit hexadecimal number. Preferably, the hash calculation is performed using a good algorithm that results in a high percentage of unique numbers for calculations performed on different parameters and parameter patterns. For example, it is preferable that a hash calculation for "fox" results in a number that is different from the hash calculation for "red." The other fields in the numerical representation table 108 will be explained in more detail at a later point herein. Notably, other identifiers than hash numbers may be used. Hash numbers are simply one embodiment of identifiers. Numerous other identifiers may be used as well. While numerous hash value calculations are illustrated herein, they are simply one example used for ease of understanding by describing a specific embodiment.

Referring once again to the abbreviated index 102, each of the elements of the value field 106 represents a portion of a numerical representation 112 in the numerical representation table 108. Thus, the value field 106 contains a representation that a parameter pattern may be included in a set of parameters, such as a database, based on the calculated hash for the parameter pattern. In this example, when a bit is set or as used herein "true," i.e. "1" in an element of the value field 106, this is an indication that a parameter pattern may be included within a set of parameters.

For effective results, the abbreviated index typically includes a number of elements that is equal to or greater than some multiple greater than 1 of the number of parameter patterns for a set of parameters. In the present example, 15 parameter patterns are included in the illustrated set of parameters. The abbreviated index 102 corresponding to the set of parameters therefore includes 32 elements (i.e. the 32 binary digits of the 32 bit binary number in the abbreviated index 102) which is a value greater than 2× of 15. Notably, the number of a multiplier (in this example 2) provides greater confidence that a parameter pattern is included in the set of parameters as the multiplier increases. For example, in the present 2× example, if a bit in the abbreviated index is set indicating that a parameter pattern may be included in the set of parameters, the confidence is about 50%. If a 64 bit binary number representing a 4× multiplier is used to represent the abbreviated index, confidence can be increased to about 75%. Similar increases in confidence can be achieved as the number of elements used to represent the abbreviated index is increased.

Notably, the examples above use a data structure for the abbreviated index 102 that is of a size that corresponds to numbers that can be represented by a set of binary bits. For example, a 2× setting of a four bit binary structure (up to 16 binary numbers) can be represented by a 32 bit data structure. A 2× setting of a 5 binary structure (up to 32 binary numbers) can be represented by a 64 bit data structure, and so forth.

However, it may be advantageous to limit the number of bits in the data structure to a number that does not correspond to exactly the number of bits that can be represented by a binary number. For example, consider the case where 65 parameter patterns are to be represented in a 2× data structure. This means that 130 bits must be included in the abbreviated index. The binary number for 129 (0 may be includes in the 130 bits) is 10000001, an eight bit number. However, an eight bit number can represent as many as 256 bits. Thus, the abbreviated index would be 256 bits even though only 130 bits are needed for the 2× structure. This can potentially be a huge waste of memory resources. Additionally, when there is a desire to tune confidence levels, the increased binary bits may cause difficulty in assigning appropriate confidence levels.

Thus, in some embodiments, a calculated number of bits may be set aside for the abbreviated index 102 and selected portions of hash that exceed the set aside number will have their modulo entered into the abbreviated index. For example, consider the case where 130 bits are included in the abbreviated index 102. A selected eight bits of a hash of a parameter pattern is equal to 134. The modulo, or remainder of 134/130 is 4. Thus, the bit corresponding to decimal 4 (which is the fifth least significant bit of the 130 bits of the abbreviated index) can be set to index the selected portion of the hash corresponding to decimal 134. By controlling the number of bits in the abbreviated index 102, the models are less limited in the multipliers that can be used. Additionally, confidence levels can be more finely tuned than in some embodiments where the modulo is not used.

Referring once again to the abbreviated index 102 and with particular emphasis on how the existence of parameter patterns are noted in the abbreviated index 102, note that FIG. 1 includes the last five bits of hash field 116. The last five bits of hash field represents the last five binary bits of the hexadecimal number in the numerical representation field 112. Five bits are selected because that is the number of binary bits needed to represent 32 unique binary numbers, the number of binary bits in the abbreviated index 102. Note that while the last five bits have been chosen in this example, embodiments are not limited to just the last bits. Any appropriate selection of bits can be used. In this example, so long as the same bits are used consistently to set bits in the abbreviated index 102, effective filtering can be performed.

For illustration purposes, the last 8 bits of the numerical representation in the numerical representation field 112 can be calculated by converting the last two hexadecimal numbers to binary numbers. For example, for the parameter pattern "fox" in the parameter pattern patterns field 110, a hash of 40b8636cf497235c is calculated as shown in the numerical representation field 112. The last two hexadecimal numbers of the hash are 5c. These numbers represent the 8 bit binary number 01011100 as shown in the last 8 bits of hash field 114. By truncating the three most significant bits, the five least significant bits remain which are 11100 as shown in the last 5 bits of hash field 116. For simplicity in explanation, the last 5 bits can then be converted back to a hexadecimal number, which is 1c as shown in the hex of the last 5 bits field 118.

Thus the bit indexed by 1c in the index field 104 is set in the value field of the abbreviated index 102. As illustrated, continuing this process for each of the parameter patterns in the parameter patterns field 110 results in the element in the value field 106 corresponding to the index numbers of 3, 5, 9, d, 11, 15, 16, 18, 1c, and 1f in the index field 104 of the abbreviated index 102 are set. Notably, the abbreviated index 102 includes a sampling of representations that can be maintained by the abbreviated index.

The abbreviated index 102 can then be used at a later time to determine the probability that a parameter pattern is represented in a database. In particular, the abbreviated index 102 can front end a database, full text index, or hyperspace index as described in more detail below. Before performing a full text search on, for example a database, a check of the abbreviated index 102 can be made for the parameter pattern. This can be done by hashing the parameter pattern, and in this case, checking the last 5 bits of the hash as an identifier for the parameter pattern to see if the identifier appears in the abbreviated index 102. If it does not appear in the abbreviated index, it can be determined with 100% accuracy that the particular parameter pattern does not exist in the database front-ended by the abbreviated index 102. However, if the identifier is in the abbreviated index 102 it is known, in this example, that there is about a 50% chance that the parameter pattern appears in the database. This confidence can be increased by searching of related parameter patterns. For example, if the search term entered by a user is "quick red fox," confidence can be increased by checking the abbreviated index 102 for indicators for "quick," "quick red," "red fox," "red," etc.

Other methods can also be used to increase search confidence. For example several identifiers could be entered into the abbreviated index 102 for a single parameter pattern. This may be done in one of several ways. Just a few examples, which should in no way be interpreted as limiting are now illustrated. For example, one method of including different identifiers for a single parameter pattern includes using a number of different hashing algorithms on the same parameter pattern. For example, an identifier for "fox" using a first hashing algorithm and a different identifier for "fox" using a second, different hashing algorithm may be implemented. In another example, arbitrary strings or numbers may be added to a parameter pattern before an identifier is created for the parameter pattern. Thus identifiers for "fox-1," "fox-2," and "fox-3" may all be hashed to create three different identifiers for the parameter pattern "fox."

Another method that can be used to increase confidence is to decrease the density of entries in the abbreviated index 102. For example, in the example above, the density of entries in the abbreviated index is about 50%. If the abbreviated index 102 is increased in size such that only about 25% of the possible entries will include an indexed identifier, done by doubling the size of the abbreviated index 102, the confidence increases to about 75% with a single referencing of the abbreviated index 102.

This application describes further enhancements and increased accuracy for the abbreviated index and for traditional indexes. In particular, one aspect of this application describes a process for zooming in on dense areas of data.

Dense areas of data are those where there may be a significant amount of overlap of data items. For example, suppose a database in question is the social security death index (SSDI). The SSDI lists information about various individuals who have had a United States social security number and who have died. For example, the SSDI may list name information, birth date and place, death date and place, etc. There are particularly dense areas of this database. Perhaps the densest space is the space occupied by listings of John Smith. In the SSDI, there are thousands of entries for John Smith. Thus, there may be some difficulty in resolving in on a particular John Smith about which information is specifically desired. Invariably, some of the John Smiths will have overlapping birth years, months and/or days, others will have overlapping death years, months and/or dates, additionally, other information may overlap as well.

As described previously, the abbreviated index can include entries for different element combinations. Thus, for example, an abbreviated index entry may be included for John Smith 1917 for a John Smith born in 1917. Additionally, a different abbreviated index entry may be included for John Smith 1942 for a different John Smith born in 1942. If a search string is entered for "John Smith 1917 1942," to find a John Smith that was born in 1917 and died in 1942, the abbreviated index may be checked for different elements such as John Smith 1917 and John Smith 1942. Both of these will have an entry in the abbreviated index data structure and will indicate a likelihood that and entry with John Smith 1917 1942 exits in the database. However, this is a false positive as the two John Smiths are two separate records. As such, a full search of a database front-ended by just a single abbreviated index will not yield a result for John Smith 1917 1942. This can result in searching of a full database when such a search would be fruitless. By zooming in on dense areas in the abbreviated index, some of this searching in the full database can be avoided.

In one embodiment, the zoom function can be accomplished by employing a number of distinct abbreviated or other indexes arranged in a hyperspace index, where the indexes are indexes nested within other indexes. Dense entries can be divided among the smaller indexes, thus reducing the likelihood that a collision will occur giving a false positive. For example, in the example above, if John Smith born in 1917 is in one of the smaller indexes, and John Smith born 1942 is in a different smaller index, a search for John Smith 1917 1942 will yield a result indicating that such an entry does not exist when either of the two smaller indexes is searched. In this way, unfruitful searches on the full database can be avoided.

Referring now to FIG. 2, an example of a hyperspace index 200 is illustrated. The hyperspace index can be conceptualized as a multi-level hierarchical index, where the index is sliced into multiple lower levels with each level diced to contain fewer documents or records. Dense areas of data can be dispersed in the lower levels, such that intersecting patterns that may result in false positives can be eliminated or at least significantly reduced.

For example, the hyperspace index 200 illustrated in FIG. 2 includes five levels, that in this example are labeled from L0 at the lowest level to L4 the highest level. Level L3 includes a division of data from L4. L2 includes further division of data from fields in the L3 level. L1 includes a division of data from fields in the L2 level. L0 includes a division of data from a field in the L1 level.

At the lowest level L0, the hyperspace index 200 may include leaf nodes. The leaf nodes of the hierarchy described may correspond to reference numbers that refer to, for example, documents, portions of documents or records in a database. To facilitate the typical depth first processing of the hyperspace index, the preferred ordering of these references is from most generally reliable and relevant documents or records to the least reliable and relevant documents and records. Even if highly reliable documents' indexes are centrally located in more powerful servers, individual servers are preferably configured to contain documents or records with the same reliability or relevance.

As the parameter patterns that specify a search query are processed, searches that are considered of highest relevance are processed first in the preferred implementation and then lower relevance search parameter patterns are processed in order from highest relevance to lowest. If the search request is for the N most relevant hits, when the most relevant search requests have located N hits, then the search process can be stopped to save further processing that will result in only less relevant hits. Linguistic processing of the search query can also determine which of the list of sub-searches using parameter patterns are applicable to the query to determine a cut off point where lower relevance search parameter patterns can be ignored.

The hyperspace index 200 may be embodied, for example, in a computer readable medium in a computing environment. For example, RAM memory may be used to implement a data structure for indexing identifiers. FIG. 2 illustrates a RAM memory block 201 that may be used to embody the data structure.

The identifiers correspond to parameter patterns. For example, as illustrated in FIG. 1, for the abbreviated index 102, which can be used as the first field 202 in the hyperspace index 200, the identifier 1C corresponds to "fox," the identifier 18 corresponds to "red," the identifier 5 corresponds to "red fox," etc. Notably, the abbreviated index 102 includes a sampling of representations that can be maintained by the abbreviated index. Other parameter and attributes can also be represented in the abbreviated index. For example, various attributes may be associated with parameter patterns. For example, one attribute may specify that a parameter pattern is an exact phrase. This could be represented for example as "red fox-x." Another example may include an attribute that specifies that a parameter pattern is an ordered near phrase (as will be explained in more detail herein) such as by the representation "quick fox-n." Similarly, an attribute may be included that specifies the parameter pattern is an unordered near phrase such as by the representation "fox quick red-u." Other illustrative attributes could include items such as but not limited to type of record, e.g. book reports and/or reliability of the record or document. The parameter patterns and their associated attributes may be indexed in a single array. Attributes may be part of the original parameter pattern. Alternatively, the attributes may be combined with pre-computed pattern hash values to make a new hash value. These parameter patterns can be grouped into sets of parameter patterns that differ in how well they satisfy a search, or how relevant they are. For example, an exact phrase would be categorized as more relevant than a near phrase.

The presence of an identifier in the data structure indicates that the corresponding parameter pattern may be present in a set of parameter patterns, such as a set of data objects in a database. The presence of an identifier, in this particular embodiment, only indicates a possibility because of the possibility of collisions. For example, as illustrated in FIG. 1, the identifier 1C may indicate that "fox" or "quick" is in a data space. However, if a data space only contained "quick" and a search were done for "fox" an identifier for "fox" would be in the abbreviated index 102, but would be a false positive for "fox." Thus, the presence of an identifier merely illustrates the possibility of a parameter pattern being present in the data space front ended by the hyperspace index 200.

Notably, embodiments may be implemented where the presence of an identifier in the hyperspace index 200 could indicate with more certainty that a parameter pattern is present in a data space. This may be done by using longer sequences of the hash codes from a good hashing algorithm. This implementation would use small parameter pattern records to store the hash codes, a hash ID index, instead of an abbreviated index. Alternatively, using the ASCII representation individual letters in a string combined together could be used as the identifier. This is essentially creating a full text index of parameter patterns, and while less efficient than the abbreviated index described previously, could nonetheless be used as a field in the hyperspace index 200. Further examples of this embodiment will be described in more detail below in conjunction with the description of FIG. 3A.

Absence of the indicator in the data structure can be used to indicate that the corresponding parameter pattern is not present in the set of parameter patterns. In the present example, the data structure implements the hyperspace index 200. The hyperspace index 200 includes a first field 202. In the present example, the first field 202 includes the totality of the top level L4. The first field 202 includes a set of binary bits. Each binary bit corresponds to a possible identifier corresponding to a parameter pattern from among a first set of parameter patterns. If the bit is set, the identifier is included in the first field. Setting the bit, of course, is not limited to having the bit high or level "1." For example, in negative logic systems, setting a bit may include setting the bit to 0.

One or more additional fields hierarchically below the first data field may be included in the hyperspace index 200. The additional fields shown in FIG. 2 are represented by the designators 204 through 224. For example, in FIG. 2, fields 204 and 206 are hierarchically below field 202. Fields 208 and 210 are hierarchically below field 204, and fields 212 and 214 are hierarchically below field 206. Fields 216 and 218 are hierarchically below field 212 and fields 220 and 222 are hierarchically below field 214. The fields represented by 224 are hierarchically below field 220.

Each of the additional fields may include identifiers for a subset of the first set of parameter patterns represented by identifiers in the first field. For example, parameter patterns from the first data field 202 may have an identifier for them included in any one of the fields represented by the designators 204 through 224. Notably, the identifiers in the additional fields will likely not be the identifiers in the first field 202. However, the identifiers in the additional fields may have some relation to the identifiers in the first field so as to maintain location information about the parameter patterns. For example, the different identifiers for the same parameter pattern may be calculated using the same hash algorithm. This will be discussed in more detail below. Notably, in one embodiment, different hash algorithms may be used for different levels. For example, a first algorithm may be used for even levels, while a second algorithm could be used of odd levels. This can be used to eliminate a false positive that may follow down through lower hierarchical levels. In an embodiment similar to this, different portions of a hash may be used for different levels. For example, a 64 bit hash may be used to calculate the identifiers, where the most significant 32 bits are used for Level L4, the least significant 32 bits for Level L3, the most significant 32 bits again for Level L2, the least significant 32 bits for Level L1, etc. This approach significantly helps the resolution of collisions and corresponding false positives for the embodiment using the abbreviated index with its high probability of collisions. It also improves the efficiency of the alternative embodiment using small hash ID records to reduce even more the possibility of false positives.

In addition, or alternatively, each of the additional fields may include identifiers for a parameter pattern related to one or more of the parameter patterns in the first set of parameter patterns. For example, while fields lower in a hierarchy may not include identifiers for the exact same parameter pattern, the fields lower in a hierarchy may include related parameter patterns. This may be used, for example, in fuzzy logic applications or other applications. Consider the various parameter patterns that are identified for the "The quick red fox" example shown in FIG. 1 in the first field 202. Field 204 may contain an identifier for a parameter pattern that includes "pink." "Pink," being a shade of red, may be used in a fuzzy logic algorithm that relates parameter patterns including "pink" to parameter patterns including "red."

In addition, or alternatively, each of the additional fields may include identifiers for a subset of parameter patterns or related parameter patterns represented by one of the other one or more additional fields hierarchically above the field. For example, fields 208 and 210 may include identifiers for parameter patters represented in field 204, and/or identifiers for parameter patterns related to parameter patterns in field 204.

The absence of an identifier corresponding to a parameter pattern for a particular field indicates that the parameter pattern is not represented by an indicator in fields hierarchically below the field irrespective of the presence of identifiers corresponding to the parameter pattern being present fields hierarchically above the field that does not include an identifier corresponding to the parameter pattern. For example, if field 214 does not include an identifier for a parameter pattern or an identifier for a parameter pattern related to the parameter pattern, then fields 220 and 222 and the fields represented by 224 will not include a valid indicator corresponding to the parameter pattern or a related parameter pattern. Notably, while in this example higher level fields may not include the indicator, the fields lower in the hierarchy could include indicators that could correspond to the parameter pattern, or a related parameter pattern, they will not be valid and will not actually indicate the possible presence of the parameter pattern or related parameter pattern, but will instead be a false positive.

The absence of an identifier corresponding to a parameter pattern in at least one of the fields of each of the hierarchical threads indicates that the parameter pattern is not present in the set of parameter patterns. For example, if an indicator for a particular parameter pattern does not appear in any of the lowest fields 208, 210, 216-222 or the fields represented by 224, then the parameter pattern does not appear in the set of parameter patterns, and data in the data space that one is attempting to identify by locating the parameter patterns does not exist in the particular data space. Fields 208, 210, 216-222 and the fields represented by 224 are the lowest fields and are each in a separate hierarchical thread. However, absence is not limited to just the lowest fields in a hierarchical thread, but absence at any level may indicate the absence of a parameter pattern in a data space. For example, if field 214 does not include the particular indicator, then the parameter pattern in not in the data space irrespective of what indicators are in fields 220, 222 and the fields represented by 224. These fields may have an indicator for the parameter pattern, but it will be a false positive if it exists at all.

While one embodiment of a data structure has been described in general terms, more specific embodiments will now be set forth. As illustrated in FIG. 1, the hyperspace index 200 may be such that identifiers are derived from a calculated hash of a corresponding parameter pattern. Additionally, location information of an identifier for a parameter pattern in the first field can be preserved in hierarchically lower fields by deriving identifiers for the parameter pattern in the lower fields using the same calculated hash that was used to derive the identifier for the parameter pattern in the first field. For example, assume that a data space includes the following entries:

| Record Number | Name | Birth | Death |
|---|---|---|---|
| 0 | Grace Muzzey | 1902 | 1975 |
| 1 | Rhea Villancourt | 1905 | 1994 |
| 2 | George Crosby | 1908 | 1975 |
| 3 | Margaret Lanouette | 1907 | 1987 |
| 4 | William McHugh | 1896 | 1968 |
| 5 | Mamie Curtice | 1890 | 1976 |
| 6 | Ruth M. Colby | 1906 | 2000 |
| 7 | Eloi St. Germaine | 1903 | 1988 |
| 8 | Wilson Benner | 1918 | 1975 |
| 9 | Earl Rand | 1897 | 1964 |
| 10 | John Kennedy | 1898 | 1963 |
| 11 | John Kennedy | 1917 | 1976 |
| 12 | John Kennedy | 1917 | 1981 |
| 13 | John J. Kennedy | 1917 | 2003 |
| 14 | John Kennedy | 1917 | 1978 |
| 15 | John Kennedy | 1879 | 1963 |
| 16 | John Kennedy | 1891 | 1963 |
| 17 | John Kennedy | 1885 | 1963 |
| 18 | John Kennedy | 1917 | 1975 |
| 19 | John Kennedy | 1903 | 1963 |

The above entries are records from the Social Security Death Index described previously herein. To index the records, various algorithms may be used to create identifiers for parameter patterns. The following are some simple hexadecimal hashes, and their corresponding last 13 bits, for some of the entries in the data space:

| Parameter | Hexadecimal Hash | Last 13 binary bits |
|---|---|---|
| John | c1786311 | 0001100010001 |
| Grace | 096a54c1 | 1010011000001 |
| 1917 | da97a1d3 | 0000111010011 |
| 2000 | 31f45de0 | 1110111100000 |

Figure 3B:
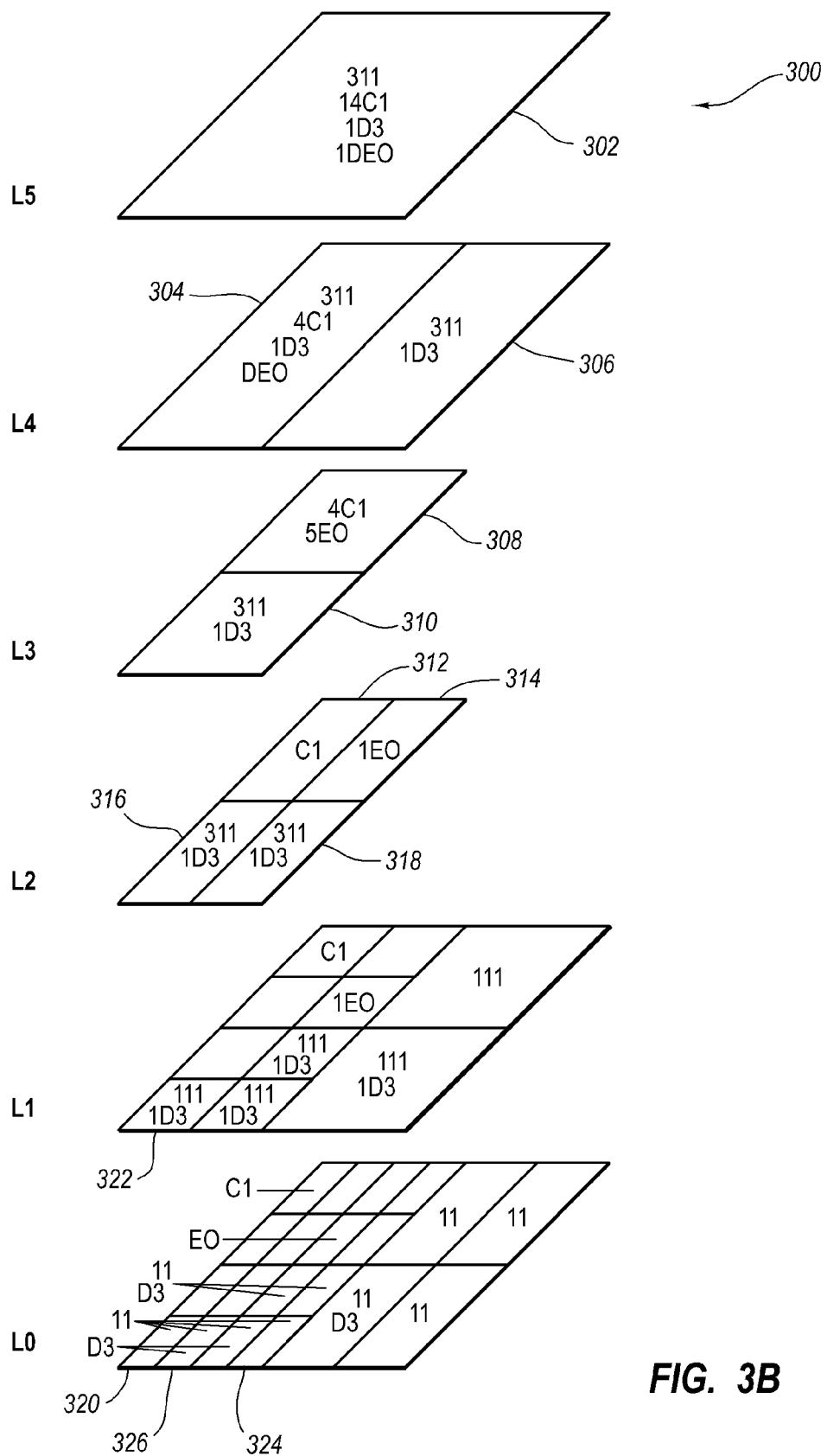
FIG. 3B illustrates a graphical representation of a hyperspace index.

Identifiers can be entered into a hyperspace index such as the hyperspace index 300 illustrated in FIGS. 3A and 3B. Notably, FIG. 3A illustrates actual record information in the data space 301. At level L5, parameter patters are shown as being in the hyperspace index, but for this first example, this is only shown for convenience. Note that in other examples described herein, the parameter pattern may be included in fields of the hyperspace index 300 as their own indicator, however, the following example is directed to indicators other than the parameter pattern itself. In the present example, the identifiers are based on the last 13 binary digits of the calculated hash. At level L5, all 13 binary digits of the calculated hash are used as the identifiers resulting in identifiers 311, 14c1, 1d3 and 1de0 in hexadecimal in the field 302 at level L5. At level L4, the last 12 binary digits are used as the identifier such that a first field 304 has identifiers 311, 4c1, 1d3 and de0, and a second field 306 has identifiers 311 and 1d3. At level L3, the last 11 binary digits are used as the identifier, such that a first field 308 has identifiers 4c1 and 5e0, and a second field 310 has identifiers 311 and 1d3. At level L2, the last 10 binary digits are used as the identifier resulting in a first field 312 with identifier c1, a second field 314 with identifier 1e0, a third field 316 with identifiers 311 and 1d3 and a fourth field 318 with identifiers 311 and 1d3. At level L1, the last 9 binary digits are used as the identifier. At level L0, the last 8 binary digits are used as the identifier. The number of bits selected can be optimized as will be explained in more detail below where a method of creating a hyperspace index is described. It should be noted that the parameter patterns may be represented by fewer bits as the levels go lower. This is because each level and index within that level have fewer parameter patterns to represent. A less drastic reduction in the number of hash bits of the identifier would be used by the alternative embodiment using small hash ID records. In that embodiment, 32 bits might be used at the highest level containing 16 million parameter patterns, reducing false positives on hash collisions to 1 out of 256, much improved over the 1 out of 4 or 1 out of 8 typical for the abbreviated index implementation. At level L1, in one of the indexes at that level, 14 bits might be used to represent only 64 patterns, also reducing false positives to 1 out of 256 at that level as well. Between these two embodiments, the much better search resolution of the small hash ID record embodiment is balanced out by the efficiency of memory usage of the abbreviated index embodiment.

As can be seen from examination of the record data shown at level L0, "John Kennedy" and "Birth 1917" represent dense areas of the data space. In contrast, "Grace" and "Death 2000" are less dense areas of the data space. As such, identifiers for "John Kennedy" and "Birth 1917" are spread across a number of different fields to reduce collision occurrences where the presence of an identifier might falsely indicate that a particular record is present in an area of data space when the particular record is, in fact, not in that area of the data space. Even in a data space that is not dense, this facilitates navigating through down to the individual record corresponding to identifiers as will be demonstrated below.

A hyperspace index such as hyperspace index 200 or 300 may be used in searching applications. As such, the parameter patterns may include search specifiers. Search specifiers may be something as simple as a data element in a data space such as "John," "Grace," "1917," or "2000" in the example illustrated in FIG. 3, "quick," "red," or "fox" as illustrated in FIG. 1.

Search specifiers may include logical combinations of search terms. For example, "quick AND red" may be a logical Boolean combination of search terms from the example illustrated in FIG. 1. Modern logical searching has also been extended to include other search functionality as well. For example, an exact phrase may be specified where search terms must appear exactly as specified in the search. Thus, "quick red fox" may be a search specifier that can be indexed into the hyperspace index. Additionally, proximity may be a search specifier. For example, a search specifier may specify that "quick" is within 5 words of "fox." Alternatively, a search specifier may specify simply that "quick" is near "fox."

In one embodiment, the search specifiers may include indications that a search term or search terms are part of a question or an answer. Thus, for example when a search is performed that can be determined to be a question, the corresponding answer can be located by recognizing that the indexed identifier includes an indication that the corresponding parameter pattern is an answer. For example, the question may be "what did the quick red fox jump." An answer for this is example may be "the lazy brown dog." Thus, "what quick red fox jump" may be used to create an identifier that includes an indication that the search specifier is a question. "The lazy brown dog" may be represented by an identifier that indicates that it is the answer to the question for "what quick red fox jump." This answer might be stored, for example, in the leaf record at level L0.

Other language type criteria may be included in codes used for creating identifiers. For example, information pointing to parts of speech, areas of scholarship, intelligence of author, etymology, cognitive preference to which the data might appeal, personality type to which the data might appeal, consumer preferences to which the data might appeal, etc. may be included in the indicator. Virtually any information, whether homogeneous with the information in the data space or not, can be included in the hyperspace index to make searching faster and more precise. These are examples where multiple dimensions of information are mapped into the same space for indexing and searching.

In a similar vein, parameter patterns may further include ranking information combined with search specifiers. Thus, for example, importance according to some criteria may be applied to data in the data space before an identifier is created. The identifier can then take into account the importance data. For example, if the data in the data space concerned automobiles, a ranking of safety, or cost, or gas-mileage could be applied to the data before identifiers for the data and ranking were created. As such, when searching is performed later using the index, any results not within a predetermined threshold of some factor could be eliminated from the results returned to a searcher. Thus, for example, for data on a particular car, a safety level 3, cost level 2, and mileage level 5 may be applied to parameter patterns for the data on the particular car. When searching for the specified importance information, specialized searching may be implemented. For example, if a user specifies a search with criteria that the safety level be greater than 3, this may translate into an actual search of the hyperspace index which includes a Boolean expression such as Safety level 3 OR Safety level 4 OR safety level 5, in a case where 5 is the maximum safety level. Notably, when multiple ORing operations are used in searching, the potential for collisions or false positives increase. This can be counteracted, for example, by including multiple indicators for a given parameter pattern or by using another form of the index that has a smaller potential for collisions such as the small hash ID record embodiment.

In addition, the ranking information may include personalized ranking through customized criteria. For example, a user may specify one characteristic as being ranked higher than other characteristics. For example, in the automobile example above, a user may rank safety first, gas-mileage second, and cost last. The user may nonetheless specify thresholds for these criteria which all returned answers must meet, however, the specified preference order can be used to resolve any conflicts or "ties" in ordering. Notably, the application of ranking information may be used when searching lower levels of the hyperspace index while not being used at higher levels. This may be done as searching using the ranking information at higher levels may be too dense to elicit much helpful information while at lower levels, the information has been sufficiently spread such that appropriate resolution on ranking information can be accomplished.

Similarly, parameter patterns may include an ordering according to a priority. Thus, some priority may be assigned in parameter pattern before an identifier for the parameter pattern including the priority is generated. Thus, searching, as will be explained in more detail below, can be performed by searching higher priority parameter patterns before searching lower priority parameter patterns.

Similarly, the parameter patterns may include ranking information combined with search terms. The ranking information can include, for example, a user preference ranking, job appropriate ranking, profession appropriate ranking, linguistic appropriate ranking, stylistic appropriate ranking, and ranking based on previous searches.

In one embodiment, fields in the hyperspace index are organized into hierarchical threads according to a ranking such that referencing of the data structure for identifier entries can be accomplished by following higher ranked hierarchical threads first. For example, the "John Kennedy" indexed at 320 may be more important under some criteria than other "John Kennedys." As such, the thread which contains the indicator for John Kennedy indexed at field 320 may be arranged such that it is searched before other threads. In this example, this thread includes fields 302, 304, 310, 316, 322, and 320 in order of highest in the hierarchy to lowest in the hierarchy.

Similarly, the hyperspace index can be such that fields are organized such that fields beyond a given threshold are not relevant. The threshold may be any one of a number of factors such as exceeding a desired number of results, not meeting user defined criteria, not being well used enough, etc. Thus, in the example illustrated above, any "John Kennedy" beyond the one indexed at 324 may be deemed to be beyond a threshold. When the hyperspace index 300 is referenced for indicators, threads beyond the threshold will not be referenced. For example, any threads including field 306 and those fields hierarchically below field 306 will not be referenced to find indicators for parameter patterns for "John Kennedy." While referencing the hyperspace index has been discussed here, a more specific treatment of hyperspace index referencing is included below. One way to show this higher relevance or importance of a complete record or document is to order the index so the records or documents go from high relevance at low record or document numbers to low relevance at high record or document numbers.

In the hyperspace index, fields may be sized with a selected granularity to set a level of search resolution. For example, in one embodiment, fields may be subdivided into $\frac{1}{2}^k$ division sizes, where k is a whole number. The variable k may be selected to be a higher number for finer grained resolution and a lower number for coarser grained resolution. Note that while $\frac{1}{2}^k$ division sizes are illustrated herein, other non 2 based divisions may also be implemented. However, such divisions may require additional processing not required in the $\frac{1}{2}^k$ division sizes. Additionally, while a specific method of creating lower level fields has been illustrated, other methods and divisions may also be used within the scope of embodiments of the invention.

The hyperspace index may be such that subsets of parameter patterns or associated parameter patterns are sub-divided into fields according to characteristics of objects represented in the field. For example, the field 202 in FIG. 2 may include indicators for parameter patterns for an entire book. Fields 204 and 206 may include indicators for parameter patterns for chapters in the book. The fields 208 through 214 may include parameter patterns for paragraphs. Specifically, fields 208 and 210 may be for paragraphs in the chapter represented by field 204, and fields 212 and 214 may be for the chapter represented by field 206. Fields 216-222 may be for parameter patterns for sentences. The fields represented at 224 may be for phrases within those sentences. Using this embodiment, a field itself can give resolution information by providing some categorical information for the parameter patterns represented in the field. Additionally, this organization allows for an easy way of determining which of many different granularities the parameter patters are grouped in for relevance calculations. Simply traversing through the hyperspace index structure depth-first, and testing multiple parameter patterns that specify the search, can give information on parameter patterns that are within the same document, chapter, paragraph, sentence or phrase, thus dynamically calculating relevance affecting attributes.

Figure 4:
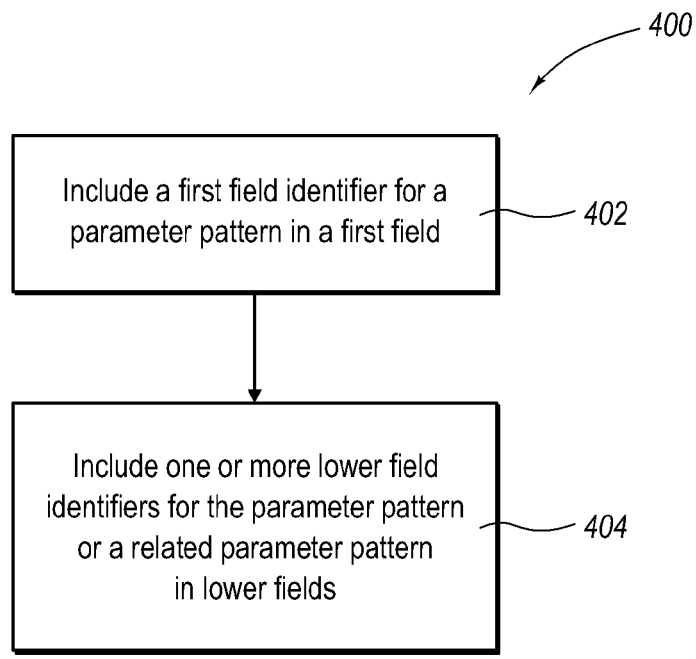
FIG. 4 illustrates a method for creating a hyperspace index.

Embodiments may include methods, such as method 400 illustrated in FIG. 4, for indexing identifiers into a data structure to create a hyperspace index. The identifiers correspond to parameter patterns. The presence of an identifier in the data structure indicates that the corresponding parameter pattern may be present in a set of parameter patterns. The absence of an indicator in the data structure can be used to indicate that the corresponding parameter pattern is not present in the set of parameter patterns. When hash values are used, expensive sorting during the indexing process can be avoided, thus greatly improving the speed of indexing. While in the following example, the creation of the hyperspace index is discussed from the top level down, it should be understood that the acts illustrated in FIG. 4 may be applied in any appropriate order. The order discussed here is not intended to limit the order of actual application of the principles of this particular embodiment.

Identifiers are created for parameter patterns. For example, In FIG. 3A, the identifier for the parameter pattern John for the first field 302 is the hexadecimal number 311. In this particular example, the parameter pattern 311 is derived from a hash calculated for John where the 13 least significant bits of the hash are used as the identifier.

A first field identifier is included for a first parameter in a first field (act 402). For example, FIGS. 3A and 3B illustrate that the identifier 311 for John is included in the first field 202. The first field includes a number of binary bits. Each binary bit corresponds to a possible identifier corresponding to a parameter pattern from among a first set of parameter patterns. When a bit is set, the identifier associated with that bit is included in the first field. An example of this is illustrated in FIG. 1. The identifier for "fox" in FIG. 1 is 1C. The abbreviated index 102 may be equivalent to the first field 202 shown in FIG. 2, or 302 shown in FIG. 3. The bit corresponding to 1C in the abbreviated index 102 is set indicating the possible presence of "fox" in a data space being front ended by the hyperspace index. Note that the presence is only a possibility due to possible collisions. In the present example, shown in FIG. 1, "fox" collides with "quick red fox" where each of the parameter patterns has an indicator equal to 1C. Thus a data space that only includes "fox" may falsely indicate the presence of "quick red fox." To resolve collisions, additional data fields in the hyperspace index data structure are used.

Referring once again to FIG. 4, the method 400 further includes an act of including one or more lower field identifiers for the first parameter pattern or a parameter pattern related to the first parameter pattern in one or more additional fields hierarchically below the first data field (act 404). Each of the additional fields includes at least one of identifiers for a subset of the first set of parameter patterns represented by identifiers in the first field, identifiers for a parameter pattern related to one or more of the parameter patterns in the first set of parameter patterns or a subset of parameter patterns or related parameter patterns represented by one of the other one or more additional fields hierarchically above the field including the identifiers. For example, referring to FIG. 3A, field 302 includes indicators for John (311), Grace (14c1), b. 1917 (1d3) and d. 2000 (1de0). Field 304 includes indicators for a subset of these parameter patterns, which in this case, the subset just happens to be the entire set of parameter patterns. Note however that the indicators for parameter patterns in field 304 are not necessarily the same indicators as in field 302. For example, the indicator for d. 2000 in field 302 is 1de0 while the indicator for d. 2000 in field 304 is de0 in Hexadecimal. This is because indicators in field 302 use 13 bits of a hash for the indicator, whereas indicators for field 304 use 12 bits of the same hash. By using the same hash, location information can be preserved. Field 306 includes indicators for John and b. 1917.

Fields lower in the hierarchy include indicators for subsets of parameter patterns or related parameter patterns for fields higher in the hierarchy. In the present examples, the higher and lower relationships apply at a parent child relationship.

Thus for example, in FIG. 2, Fields 208 and 210 are children of 204 and as such lower in hierarchical position. However, fields 212 and 214 are not lower in hierarchical position than field 204 because they are not direct descendents of field 204.

As explained previously, related parameter patterns may be included. For example, while one field contains a parameter pattern that includes "red," a related parameter pattern may include "pink" which is a shade of red.

In one embodiment, the first parameter pattern is a parameter pattern for a data object. The method 400 may further demand including additional identifiers for additional parameter patterns for the data object in the first field and including additional lower identifiers for the additional parameter patterns or related additional parameter patterns in the one or more additional fields hierarchically below the first data field. For example, in the "the quick red fox" example above, parameter patterns may include the 15 patterns shown in the parameter patterns field 110. Parameter patterns may also include ordering information, near information, part of speech information, frequency information, or any other relevant piece of information, whether homogeneous with the data or not. Any of these additional parameter patterns for a particular data object can be included in the hyperspace index 200 or 300.

Notably, the number of parameter patterns for a data object may be different in different fields. For example, field 202 may include 10 indicators for different parameter patterns for a data object, while field 220 might include 20 indicators for parameter patterns for the same data object. This allows for more precise indexing by asking additional questions as a search narrows to smaller fields. The levels where different parameter patterns are located is coordinated between the indexing and searching processes to enable the search process to work.

Further still, fields may have a different number of parameter patterns represented for each data object. Thus for example, 20 parameter patterns may be represented in the first field 302 for John Kennedy at record number 15, while only 10 parameter patterns are represented in the first field 302 for Grace Muzzey at record number 1. It should be noted at this point that the example in FIG. 3 only shows some of the indicators for parameter patterns that might be included. It should be understood that other indicators can be included in the fields illustrate there.

Typically when a hyperspace index is created several parameter patterns will be selected by a parameter pattern generating algorithm. To illustrate a simple example, one algorithm might generate 10 patterns for each data object included in the hyperspace index. Using the example of FIG. 3A, 20 data objects, or in this case records, are represented.

To sufficiently spread indicators in a field array one or more multipliers may be used. Illustratively, if 10 parameter patterns are to be represented in a field, the field should have more than 10 bits, otherwise nearly every parameter pattern will be represented in the field because every or nearly every bit will be set. For 10 parameter patterns and a multiplier of 2, 20 bits will be used for the field. For 10 parameter patterns and a multiplier of 4, 40 bits will be used for the field. To obtain a suitable spreading of identifiers within a field, the number of digits used for identifiers is typically multiplied by some multiplier where the higher the multiplier the better the accuracy, but the more memory that needs to be used for the field. Additionally, the number of bits can be rounded up to the nearest $2^n$ number. For example, for 40 bits, the closes rounded up $2^n$ number is 64. Because of the way hashes are calculated and identifiers included in a field, working with $2^n$ numbers may require less computing. Otherwise, in one embodiment, the modulo technique discussed above may be used. Other techniques may also be used within the scope of other embodiments of the invention.

The method 400 may therefore include allocating memory for the first field and the one or more additional fields hierarchically below the first data field based on the number of data objects, the number of parameter patterns for each data object, and one or more multipliers. Illustrating now one example, assume that in the example of FIGS. 3A and 3B, 10 parameter patterns are used for each record, and a multiplier of 4 is used. The memory allocation for each field at level L0 is therefore 4×10 rounded up to the nearest $2^n$ number. Thus, for each field 64 bits is allocated in memory. Notably, this is specific to this example. In other examples a different number of parameter patterns or a different multiplier may be used for all of the fields, or for each field individually.

For fields in level L1, each field will have 10 parameter patterns for 2 records. Assuming a multiplier of 4, each field in L1 needs at least 2×10×4 or 80 bits. Rounding up to the nearest $2^n$ number is 128 bits that are allocated for each field in level L1. At level L2, there are 10 patterns for 4 records. Assuming a multiplier of 4 yields a field size of 4×10×4 or 160 bits, rounded up to 256 bits for each field at level L2. At level L3, each field represents 8 records. Thus, each L3 field should be allocated 8×10×4 or 320 bits rounded up to 512 bits. At L4, field 304 represents 16 records. Thus field 304 has allocated 16×10×4 or 640 bits rounded up to 1024 bits. Field 306 represents 4 records, so field 306 has allocated 4×10×4 or 160 bits, rounded up to 256 bits. L5 represents all 20 records, so L5 has allocated 20×10×4 or 800 rounded up to 1024 bits. As noted above, less bits can be used by using a modulo calculation or other reductive mathematical calculation instead of a fixed number of bits when the number of bits used is a power of two, but more computing power is required.

As noted above allocating memory may be done for each field individually based on the number of data objects, the number of parameter patterns for each data object, and a multiplier, for each field. Notably, in one embodiment, is may be more efficient to allocate memory and populate fields with indicators starting from the bottom levels, i.e. level L0, and moving up to upper levels. This would allow duplicates to be more efficiently aggregated in higher levels to save on memory space.

Notably, as discussed above, when creating a hyperspace index, it may be advantageous to create the index with a hierarchical arrangement of fields by priority. For example, higher priority fields can be arranged such that they will be referenced before lower priority fields when the hyperspace index is referenced to determine if a parameter pattern is represented.

Figure 5:
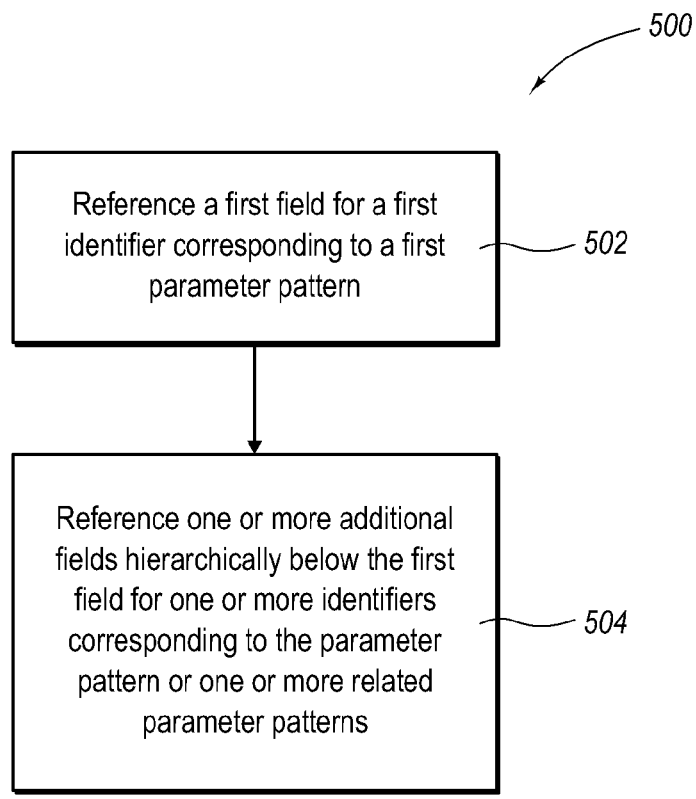
FIG. 5 illustrates a method for using a hyperspace index.

Referring now to FIG. 5, a method 500 of using the hyperspace index is shown. In particular, the method 500 is a method of locating identifiers in an index. As above, the identifiers correspond to parameter patterns. The presence of an identifier in the data structure indicates that the corresponding parameter pattern may be present in a set of parameter patterns. The absence of the indicator in the data structure can be used to indicate that the corresponding parameter pattern is not present in the set of parameter patterns. The method includes an act of referencing a first field for a first identifier corresponding to a first parameter pattern (act 502). The first field comprises a first plurality of binary bits, each binary bit corresponding to a possible identifier corresponding to a parameter pattern from among a first set of parameter patterns. When the bit is set or the identifier occurs in a small hash ID or full text index, the identifier is included in the first field.

For example, a user may wish to perform a search for John Kennedy born in 1917. A first parameter pattern used for the search may be John. An identifier may be generated for purposes of the search. The identifier is generated using a method similar to how identifiers are calculated for creating the hyperspace index. In particular, in this example, the same hashing algorithm that was used to create the hyperspace index is used to create a hash of John. This hash is 1786311. The last 13 bits of this hash is 311 in hexadecimal, which is used as the identifier for John in the first field 302. Referencing the first field 302 reveals 311 does indeed appear in the first field 302. To ensure that this is not a false positive, other fields hierarchically below the first field 302 can be referenced.

As illustrated in FIG. 5, if the first identifier is in the first field, the method includes an act of referencing one or more additional fields hierarchically below the first field for one or more identifiers corresponding to the parameter pattern or one or more related parameter patterns (act 504). In one embodiment, fields may be referenced in an ordered fashion. For example, the search for indicators indicating John is present may be performed by following threads until it is clear that a parameter pattern is not represented. For example Field 302 may be referenced, followed by field 304, followed by field 308. Field 308 does not include an indicator, so referencing is terminated for the thread below field 308. Field 310 can be referenced, followed by field 316, followed by field 322, followed by field 320, where there is a match at the lowest level of the hyperspace index 300. As such, the method 500 may be such that referencing one or more additional fields hierarchically below the first data field for one or more identifiers corresponding to the parameter pattern or one or more related parameter patterns comprises referencing fields in a hierarchical thread, from higher levels in the thread to lower levels in the threads and stopping referencing fields in a thread when an identifier for a parameter pattern being referenced for does not appear in a field in the thread.

In one embodiment, at the lowest level in the hyperspace index, a number of additional searches can be performed to determine if this is the right John Kennedy. For example. A search for an indicator of a 1917 birth date may be performed. In this example, no match is found, because there is no indicator for birth 1917 at field 320. Thus, referencing continues at field 326 which does include an indicator for both John and birth 1917. Thus, the hyperspace index will return an indication that John Kennedy, born in 1917 likely exists in a database being front ended by the hyperspace index 300. Additionally, depending on how the hyperspace index is sliced and diced, the fact that the indicators were in the field 326 can provide some indication as to what part of the data space John Kennedy born in 1917 appears in. Referring once again to the example above where the hyperspace index divides a book into chapters, and then divides chapters into paragraphs, one can readily see that the field can provide an indicator as to the location of the data in the data space.

If only one result is needed, the referencing of the data base can end. Otherwise, referencing can continue until a desired number of results are found. For example, the next field that may be referenced is field 318 followed by its children fields. In one embodiment, the ability to retrieve the N most relevant records or documents using the most relevant parameter patterns is greatly improved if the database is ordered with the most relevant and reliable documents or records first before other less relevant and less reliable documents or records.

Notably, while in the above example, only a single parameter pattern is checked at higher levels, any number of patterns can be checked at any of the levels. Checking more parameter patterns at any level increases the confidence that the parameter pattern is actually in the data space front-ended by the hyperspace index. Thus, there can be a trade off between checking more patterns at higher levels to possibly eliminate all levels below the higher levels, or performing quick checks on the larger fields at the higher levels and performing more checks at lower levels where the fields are smaller.

One must keep in mind that the hyperspace index functions only with the patterns that have been pre-indexed. Thus, any parameter patterns that are checked when searching for parameter patterns, need to have been entered into the hyperspace index at an indexing stage.

A hyperspace index and its patterns may be tuned according to several parameters of the index. The density of the bit patterns, the number of child indexes per level, the size of the small hash ID or full text index records for that embodiment and the search requirements may all be tuned.

For example, if the index is set to be no denser than 25% (i.e. a 4× multiplier is used), and there are eight child index fields at the next lower hierarchical level for a field, then the following are some parameters that should be considered. If only one pattern is tested for at each index and it is in the index only once, then a lot of threads with false positives will be traversed. At each field one-fourth of the bit tests are positive just by chance (false positives), and are unrelated to the true positives that are being located. In one embodiment, if searching on a single term, such as "John" by itself in such a system, it may be advantageous to enter an indicator for that pattern into each relevant field three times. Entering multiple instances can be performed in a number of ways, such as but not limited to, using different hashing algorithms, adding an arbitrary number or string to the term, or any other appropriate method. If just two indicator entries for the term are entered into a field, there is still one chance in 16 of a false positive. For each positive, false or otherwise, eight more indexes are stacked up to check. As such, with two redundant entries for a term, every other set of eight subindexes would have a false positive come up which in turn would trigger another eight searches. If there are two or four child indexes per level, this requirement could be reduced. Alternatively or additionally, if 12.5% full indexes instead of 25% were used, that would reduce the false positives and reduce the number of bit tests that would be required as each index is referenced.

If there is a search requirement to search on last name only, then several copies of the search term (e.g. Smith, Smith2, Smith3 . . . ) may have indicators entered in the appropriate fields. If it is desired to make a very specific combination pattern such as "Famous Smiths" that may also be entered into the hyperspace index several times. For example, if there are 750,000 Smiths, one could see the value of making a combined pattern "Smith-Famous" instead of "Smith" and "Famous People" separately. This may be done to overcome the false positive percentage when only a small number of parameter patterns are searched. This problem is much less for the embodiment that uses small hash ID records instead of abbreviated pattern indexes.

Notably, in one embodiment, ranked preferences can be combined at higher levels and separated out at lower levels. For example, suppose that an index includes information about levels of famousness for "Smiths." At higher levels of the hyperspace index, it may be advantageous to simply include an indicator that includes "famous Smiths." At lower levels, indicators could be included for "Smith-famous level 1," "Smith-famous level 2," "Smith-famous level 3," and so forth. Thus, broader searches could be performed at higher levels, while more focused searches are performed at lower levels. In one embodiment, a record level, record itself, lowest level, or lowest level data space may include the ranked preference information.

Referring once again to FIG. 3A, additional features are illustrated which may be included in various embodiments. For example, FIG. 3A illustrates a number of pointers which indicate frequency (labeled "f"), child (labeled "c") and short circuit (labeled "sc"). Each of these pointers may be included in the various fields of the hyperspace index 300 as illustrated. In particular, in one embodiment, the pointers may be included as appended bits to the various indicators for the various parameter patterns. This particular embodiment including the foregoing information is attached preferably in the small hash ID or full text records embodiments.

The frequency pointer includes an indication of the frequency of indicators for parameter patterns in lower portions of the hyperspace index 300. For example, field 302 indicates that "John" has a frequency of 10 (i.e. f=10). This can indicate a number of things. Because the field 302 at level L5 represents information in the entire data space 301, this can be used to deduce that "John" appears in the data space 301 in 10 different records. To further illustrate this point, note that at level L4, field 304 shows the frequency of indicators for "John" (in this example, 311) to be 6. The frequency of indicators for "John" (in this example, also 311) in field 306 at level L4 is 4. This makes sense because level L4 is the slicing of level L5 so one would expect the total frequency of L4 (6+4) to be equal to the frequency of L5 (10). Further illustrating this point, at level L0, there are 10 total indicators representing the parameter pattern "John" ("11" is the indicator at level L0 in this example).

While in the present example, parameter patterns are carried through to each level of the hyperspace index, other embodiments may be implemented where parameter patterns are only included in selected levels and excluded from others. This would also require that when searching of the index is performed, the search algorithm takes into account these inclusions or exclusions to prevent a false indication that a parameter pattern does not appear in the data space 301. In these cases, the frequency pointer would have a more narrow scope. For example, the frequency pointer may only apply to fields at the lowest level L0 of the index that correspond to upper level fields. For example, a frequency pointer in field 312 may only indicate the frequency of a parameter pattern for all of the top four fields in level L0.

Child pointers ("c") are also illustrated in FIG. 3A. The child pointers provide an indication of the path that should be taken to find indicators for parameter patterns in lower level fields. This embodiment is used in the small hash ID or full text record embodiments. The child fields that contain a parameter pattern are connected with the parameter pattern in this embodiment. In the embodiment that uses the abbreviated index, each of the child fields will need to be checked to see if it contains the parameter pattern since these child field bits are unavailable for that embodiment. Because the child bits indicate which child nodes at level L0 contain the parameter patterns at level L1, in this embodiment the parameter patterns in level L0 can be eliminated as duplicates and no hash ID or full text index records need to be created. In the example shown, one bit is included for each lower level field represented by the child pointer. Illustratively, for level L5, there are two fields directly below field 302. These two fields are field 304 and field 306 at level L4. If a field were diced into 32 fields for the next lower level in the hierarchy, 32 bits would be used as the child pointer in the field. In the illustrated example, each of the child pointers are applicable to the fields directly below, such that the two bits illustrated in field 302 apply to fields 304 and 306. Similarly, the two bits for the child pointers in field 304 apply to fields 308 and 310.

The child pointers indicate the presence of an indicator for a parameter pattern in a lower level field. Note that while the child pointers, in this example, apply to the field directly below, other arrangements may also be implemented. Illustrating now the child pointer functionality, reference is now made to field 302 of Level L5. For an indicator for the parameter pattern "John," the child pointer has a value of c=11. The most significant bit corresponds to field 304, and the least significant bit corresponds to field 306. Both the most significant bit and the least significant bit are set indicating that the indicators for the parameter patterns represented by the indicator in field 302 appear in both field 304 and field 306. Thus, each of these fields will need to be checked as determinations are made as to the existence and/or location of a parameter pattern in the data space 301. For the indicator for the parameter pattern "Grace" the child pointer value is 10. Because only the most significant bit is set, only field 304 should be checked for indicators for the parameter pattern "Grace."

Child pointers can also be used in combination to narrow searching. For example, in one embodiment, child pointer may be logically ANDed together when associated parameter patterns are all required by the specified search. For example, if a user specifies a search of the hyperspace index 300 that includes both "Grace" and d. "2000," an ANDing of the child pointers can be used to narrow the fields of search. At field 302, the child pointer for "Grace" is 10 and the child pointer for "d. 2000" is 10. 10 AND 10 is equal to 10. Thus, only field 304 should be checked for indicators for "Grace" and "d. 2000." Illustrating yet a further example, Field 308 has a child pointer value for "Grace" that is 10 and a child pointer value for "d. 2000" that is 01. 10 AND 01 is 00. As such, it can be determined at this point that there are no fields below Field 308 that has both indicators for "Grace" and "d. 2000." Therefore, no more checks need to be made in fields hierarchically below field 308.

FIG. 3A further illustrates a short circuit pointer labeled as "sc." The short circuit pointer (also called a lightspeed jump feature) allows for lower fields to be bypassed such that a search can be focused to a particular location or record when it is known that an indicator represents a single instance of a parameter pattern. This feature can be used to optimize the small full text or hash ID record embodiments. It can decrease the size requirements for these embodiments of the hyperspace index and also increases the speed for the search by hopping immediately to the leaf fields of the hyperspace index. For example, indicators for the parameter patterns "Grace" and "d. 2000" represent single instances of those parameter patterns for the entire zoom index 300. Thus, at the top level, level L5, short circuit pointers are included to point to the given record. For example, the short circuit pointer for the indicator for "Grace" points to record 0 where the parameter pattern "Grace" appears. Similarly, the short circuit pointer for "d. 2000" points to record 6 where a 2000 death year can be located.

Short circuit pointers can be used at any level to short circuit lower levels. For example, at level L2, field 316 includes a short circuit pointer for the indicator for "b. 1917" where the short circuit pointer points to record 11. While other instances of b. 1917 appear in the zoom index 300, only the single instance at record 11 is represented in fields hierarchically below field 316.

When a short circuit pointer is used, in some embodiments, identifier entries for a parameter pattern may be eliminated in lower levels. Thus for example, in FIG. 3A, the indicators for "Grace" in field 304 (4c1), field 308 (4c1), field 312 (c1), and the first fields in Levels L1 and L2 (c1) may be removed from the hyperspace index. However, in some embodiments, it may be advantageous to leave one or more of these indicators in the hyperspace index.

For example, it may be advantageous to include indicators in the two lowest levels (in this example L0 and L1). At level L0, such indicators may be used to perform further verification on the hyperspace index 300 prior to accessing the data record or document itself (note however that the hyperspace index may be a collection of full text indexes or collection of small indexes of hash ID records as outlined in examples below). In the embodiments that do not use the abbreviated index, the child pointers can allow the identifier information to not be stored at level L0. Because of the possibilities of false positives in some embodiments and the fact that all possible sizes of patterns cannot be reasonably stored, compressed versions of the records or text that have been preprocessed to be easily scanned to verify hits can also be stored at level L0.

At level L0, indicators for a parameter pattern may be used in conjunction with parameter patterns to determine that the correct record has been identified. For example, consider the case where a user wants to search for a Grace Muzzey born in 1902. The search algorithm may use search parameters entered by a user in various ways. For example, the search algorithm may select parameter patters to search for based on the user entered search. In the present example, the search algorithm may search for "Grace" at level L5. The short circuit pointer at L5 for "Grace" indicates that the only record with the parameter pattern "Grace" is record 0 in the data space 301. As such, any further searching can be focused on the field corresponding to the record 0 in level L0. In this example, this is field 328. At this level, various indicators for parameter patterns can be checked, such as "Grace Muzzey," "Muzzey," "b. 1902," "Muzzey b. 1902," etc. When confidence is sufficiently high, a result can be returned that record 0 is likely the portion of the data space that the user is trying to find. If any of the searches for indicators for parameter patterns at field 328 come back negative, then searching can be halted on this search path through the hyperspace index and continued on other paths.

Similarly, if the various levels represent different portions of a document, then it may be advantageous to include parameter patterns at higher levels even when a short circuit pointer directs a search to a particular portion of the data space. This will allow for a multidirectional hierarchical search to be performed even when a short circuit pointer focuses on a particular portion of the data space 301. Illustratively, if a user enters a search for an exact phrase in a chapter that also includes a different phrase or word, the short circuit pointer may be able to point to the paragraph where the exact phrase is located. This paragraph may be represented in an L0 level of a hyperspace index, where the fields at the L0 level represent different paragraphs. However, to satisfy the conditions that the exact phrase be in a particular chapter with another different phrase or word, there may be a need to check indicators at a next higher level to find the different phrase or word. For example, if the fields in the L1 level represent chapters, then the field hierarchically above the field in the L0 level can be checked for the other words or phrases to ensure that the correct paragraph has been located. How many indicators are included in higher fields can be determined by how much multidirectional hierarchical searching functionality is to be provided.

Illustrating now a concrete example of this functionality. Suppose a user enters a search for "typhoid epidemic South Africa." An article exists in the data space with the following text:

At paragraph 0: Typhoid breaks out in South Africa

At paragraph 1: JOHANNESBURG, September. 20 (Xinhua)—South Africa Tuesday reported a rising outbreak of typhoid as 26 more cases recorded in the last 24 hours in Delmas, about 90 km east of Johannesburg.

. . .

At paragraph 6: She said: "We need to bring the epidemic under control and are pulling out all the stops."

Assume that level L0 indexes paragraphs. At some point, assume for example level 6, it is discovered by referencing a field at that level that indicators for a "typhoid South Africa" near phrase is found only at one point below the current field. A short circuit directly to paragraph 0 of an article can be performed. However, the query has not been completely satisfied. A search can be made up a level, at a field hierarchically above Other field where the "typhoid South Africa" near phrase is found at level L1 to check for "epidemic" where L1 includes, in this embodiment, up to 16 adjacent paragraphs in a document. When and indicator for "epidemic" is found, a hit can be added into the list to return to the user with the information that "typhoid South Africa" appears in the title and epidemic appears within 6 paragraphs of "typhoid South Africa" which directly affects the relevance calculation for the hit.

Still other optimizations may be implemented in the various embodiments described previously herein. For example, as alluded to above, any of the fields may include one or more of probabilistic identifiers, deterministic identifiers, or substantially deterministic identifiers.

One example of how a probabilistic identifier may be generated is as described previously by calculating a hash and using a portion of the hash as the identifier. Notably, as illustrated above, this can result in collisions when the same identifier is used for different parameter patterns. As described, collisions can be minimized in a number of ways including, but not limited to, increasing the size of a field with respect to the number of indicators represented in the field (i.e. instead of having a 50% full field, have a 25% full field), entering multiple different indicators for the same parameter pattern in a field, . . . .

As alluded to above, some embodiments can completely eliminate the probabilistic nature of fields in the hyperspace index 300. This can be done in several ways, including but not limited to: ensuring that a unique identifier is used for each parameter pattern or using text of a parameter pattern as the indicator one of the fields.

Additionally, embodiments may be implemented where the identifier is substantially deterministic by using a sufficiently large hashing algorithm that creates a substantially unique identifier when hashing different parameter patterns. For example, in one embodiment, a 64 bit hash may be used as the identifier for a parameter pattern in one or more fields of the zoom index. Using a 64 bit hash, approximately 16 times 10 to the 18$^{th}$ power parameter patterns can be represented uniquely.

One drawback to using a 64 bit hash for each parameter pattern is that such an arrangement may be particularly memory intensive. In one embodiment, to alleviate the memory requirements, the 64 bit hash may be split among levels. Illustratively, in one embodiment, an identifier for a parameter pattern may be generated by using the first 32 bits of a 64 bit hash. For example, an identifier for a parameter pattern for field 302 in level L5 may be generated from the most significant 32 bits of a 64 bit hash. The identifier for the same parameter pattern for fields 304 and 306 and level L4 may be derived from the least significant 32 bits of the 64 bit hash. Thus, only 32 bits at each level are used for the identifier for the parameter pattern instead of 64 bits. Notably, while in this example, the 64 bit hash was divided among 2 levels, the hash may be divided among other levels as well. Additionally, the division does not necessarily need to be evenly divided. For example, a top level may use 32 bits of the 64 bit hash, the next level may use 16 bits of the 64 bit hash, and the next level may use the remaining 16 bits of the 64 bit hash. Further, other hashes such as 128 bit, 256 bit or other hashes may be used as well. With a good hash function, the possibility of false hits will be related to how many bits can be stored in a small record containing the hash number, frequency number, child hit bits and possible short circuits. If the combinations that these bits is high compared with the number of records in the index at a given level and column, then there will be fewer false positives.

Another deterministic method for indexing identifiers in the hyperspace index 300 may be accomplished by indexing identifiers that are known to be unique. This could be done by creating a standard index of a document or database and then assigning unique identifiers to each index entry. These assigned identifiers could then be represented in the hyperspace index 300 as appropriate.

Yet another deterministic method for indexing identifiers in the hyperspace index 300 may be accomplished by indexing parameter patterns themselves. For example, the binary representation of "red" could be entered into the hyperspace index.

Illustrating now a further enhancement, an offset data structure may be used to minimize the number of compares used to reference the small hash ID indexes within the hyperspace index. Notably, the offset data structure may be used in a number of different applications independent of embodiments including the hyperspace index. Some of the various applications will be further discussed below that greatly improve the access speed to a set of records containing hash values as access keys. The following is a correlation of parameter pattern enumerators to hash values for 16 parameter patterns indicators included in a hyperspace index:

| Parameter Pattern Hash Table | |
|---|---|
| Parameter Pattern | Hash |
| 0 | ee91d57e |
| 1 | 0b0e3aee |
| 2 | 42545e50 |
| 3 | d26a6981 |
| 4 | b37a312c |
| 5 | 84c3e1a8 |
| 6 | 79f0a667 |
| 7 | d88a8dec |
| 8 | 7cfc6d29 |
| 9 | d6401941 |
| 10 | f47f1d31 |
| 11 | aabd9e7c |
| 12 | 28bbc6e4 |
| 13 | 689fb69a |
| 14 | 140da77c46 |
| 15 | 1cc4576c |

The hash values, in this particular embodiment, represent a hashing of the particular parameter pattern represented by the parameter pattern enumerator. The hashing algorithm used to generate the hash values should preferably be a good hashing algorithm that results in a highly uniform distribution of hash values across a range of hash values. From the generated hash values, a sorted table may be constructed. In this example, the table is constructed where hash values are sorted in ascending numerical order. The sorted table is illustrated below.

| Sorted Hash Table | |
|---|---|
| Table Entry | Hash |
| 0 | 0b0e3aee |
| 1 | 0da77c46 |
| 2 | 1cc4576c |
| 3 | 28bbc6e4 |
| 4 | 42545e50 |
| 5 | 689fb69a |
| 6 | 79f0a667 |
| 7 | 7cfc6d29 |
| 8 | 84c3e1a8 |
| 9 | aabd9e7c |
| a | b37a312c |
| b | d26a6981 |
| c | d6401941 |
| d | d88a8dec |
| e | ee91d57e |
| f | f47f1d31 |

To utilize the sorted hash table, an offset correlation table can be implemented to reduce the number of compares used to determine if a parameter pattern exits in an index. The offset table correlates a selected offset between a search hash and an indexed table entry. In the particular example shown, the selected offset is four bits, or the first hexadecimal digit of the hash. Notably, the sorted hash table includes hashes with the following first hexadecimal digits: 0, 1, 2, 4, 6, 7, 8, d, e, and f. No entries include a first hexadecimal digit that is 3, 5, 9, or c. By using an offset, a particular portion of an index can be specified for comparison such that comparisons can be started at the offset and ended when a next entry is greater than a searched for entry. Additionally, when no entries are included in an index for a given offset, a notation may be made in the offset correlation table so indicating. The following is an example of an offset correlation table that may be implemented in one embodiment:

| Offset Correlation Table | |
|---|---|
| Search Hash Offset | Index Table Entry |
| 0 | 0 |
| 1 | 2 |
| 2 | 3 |
| 3 | -1 |
| 4 | 4 |
| 5 | -1 |
| 6 | 5 |
| 7 | 6 |
| 8 | 8 |
| 9 | -1 |
| a | 9 |
| b | a |
| c | -1 |
| d | b |
| e | e |
| f | f |

As illustrated in this example, a search hash offset is correlated with an index table entry where appropriate. Illustratively, a user enters search criteria. A parameter pattern is created from the search criteria. The parameter pattern is hashed. Assume for example, that the parameter pattern is hashed to the hexadecimal number d2a6981. The first hexadecimal digit is d. Referencing the offset correlation table illustrates that when the first hexadecimal digit is d, comparisons should begin at the sorted hash table beginning at entry b. Entry b in the sorted hash table is d2a6981, and as such, comparisons can be ended because the desired entry has been found. A result so indicating can therefore be returned.

Illustrating yet another example, assume that the parameter pattern is hashed to the hexadecimal number d88a8dec. Again, because the first hexadecimal digit is d, caparisons begin in the sorted hash table beginning at entry b. Entry b is compared, followed by entry c, followed by entry d, at which point a match is found and the appropriate result returned to the user.

Illustrating now an example where an entry is not included for a particular search parameter pattern hash, assume that the parameter pattern is hashed to d6401942. The first hexadecimal digit of this particular hash is d, and as such, referencing of the sorted hash table is begun at entry b. Entry b is compared, followed by entry c, followed by entry d. At this point, the hash value in entry d is greater than the search parameter pattern hash, and as such a result can be returned to the user indicating that the particular identifier is not included in the index.

In yet another example, assume that a parameter pattern is hashed to c6401942. Because the most significant hexadecimal digit is c, when the offset correlation table is checked, a −1 is found. At this point it can be determined that the particular parameter pattern for which the hash is calculated does not exist in a set of parameter patterns, because of the −1 which is an indicator that the offset is not part of any of the known pre-calculated hashes.

Notably, in some embodiments, an indicator that indicates that a particular offset does not correspond to a hash code for a parameter pattern may include an indicator for locating a next hash code corresponding to a parameter pattern. For example, if the indicator were −3, it could be determined that the next parameter pattern represented by a pre-calculated hash is 3 entries further down in the sorted hash table. Understandably, alternative embodiments may be implemented where −3 indicates that the next parameter pattern represented by a pre-calculated hash is 3 entries further up in the sorted hash table.

This method of checking for the existence of a given hash key in a sorted list of hashed records takes advantage of the binary distribution characteristics of a good hash function. Because of this distribution, the average number of compares to check for a given hash key in a list of 1024 records using a 1024 entry offset correlation table is just slightly greater than one and similar in speed to the fast bit tests of the abbreviated index embodiment. Because there is a record instead of just a bit array, this embodiment allows for the inclusion of child, frequency, short circuit or other information about the parameter pattern. The duplicate entries for some parameter patterns may be eliminated and the total parameter patterns reduced. If there are 16 child branches per level in this embodiment of the hyperspace index, this implementation can be described as a self-aligning index searching structure based on resolving the hits four bits or one nibble at a time. Thus, the classic difficulty of how far to skip through a one million reference parameter pattern to find a match with a thousand reference parameter pattern is resolved quickly using the rapid depth first traversal of this embodiment of a hyperspace index.

Notably, embodiments may be practiced in a number of environments, with a number of different systems. For example, embodiments described above may be applied to searching on a single computer system, to a single database, or to other small scale systems. Other embodiments may be applied to large scale systems involving server clusters.

For example, incremental indexes may be used to retrieve hits. For optimal searches and to avoid slower searches wherever possible, a layer at a time can be applied to a group of servers involved in a search as well as within the search on individual servers.

High priority emphasized text, phrase and near phrases are among the fastest searches using the techniques described herein. Traditional searching computes these results at the end of the search processing after document intersections have been made. However, in embodiments utilizing the functionality described herein, such as for example, when the documents ordered by most relevant and reliable documents first, searches can be done incrementally with highest relevance results obtained first, until an N number of requested hits is obtained. For example, if there is a requirement to search for two words in the same paragraph or document, and if there are two hits from a phrase in the top 5% of the document space, then there would be no need to go past the 5% in depth first processing before stopping more expensive searches.

Applying these principles to a group of servers, one or more master coordination machines coordinate a search done by many servers, for example, one assigned from each search cluster. The precompiled search with all of the ordered subsearches for each search would be sent to each server along with the instruction to execute a search at level L1. The most relevant hits are low numbers so the depth first search will give the most reliable documents with the most relevant search. The coordination machine(s) determines that it has enough hits and does not give instructions to the actual search servers to do any more searches.

In one embodiment, documents with the same or similar relevance may be distributed across a set of multiple clusters of servers. The documents may be distributed proportionally across the clusters. Each cluster may search a slice of a database.

In one embodiment, several levels of searches may have been done from the coordination server level and some of those levels also involved several subsearches on each server. For example, assume that three hits have been retrieved so far and that there is a desire to make sure there are no more hits. Those three hits are in the top 20% of the static relevance ordering of the data. When the servers are given the command to do a paragraph level search, the first cut off point will be 5 hits or 20% of the database, whichever comes first. While this is among the slowest searches, i.e. "word1 word2 word3" in the same paragraph or document, the frequency information and the automatically aligning feature of the hyperspace index will help significantly. Additionally, efficiencies can be obtained by stopping the search after a given number of hits or up to a percentage of the database.

There may be situations where more than one static relevance ordering is possible. For example, sorting may be done first by most recent date or by most reliable source information. This will vary according to the search. In these two common cases, one for example for most recent news story, and the other for the most reliable source whatever the date, it is reasonable to have two copies of the database with the two different orderings.

In another embodiment, linguistics may be used to order and optimize searches. Linguistic analysis of a query can determine what kinds of queries make sense to perform. For example, "four score" does not make a great deal of sense as "four" and "score" anywhere in a paragraph. The quantifier "four" is going to be tightly bound to "score," in order and probably an exact phrase. Being able to restrict any more lower level searches, especially those where the word is anywhere in the paragraph or document, is important for the speed of the search.

By applying incremental searches to the entire group of search servers as well as the individual server, the speed of the hyperspace index can be optimized. Slower searches will be limited in scope and only done when they are needed.

Notably, embodiments may be implemented to optimize search times by using a combination of a number of the techniques disclosed herein. For example in one embodiment, the combined effect of abbreviated indexing, pattern-auto alignment and terminating a search early due to confirmation that a parameter pattern is not included in the index or due to a certain relevance or percentage being searched can provide for extremely fast searches.

As described herein, the embodiments of the present invention may comprise a special purpose or general-purpose computer. Embodiments within the scope of the present invention also include computer-readable media for carrying or having computer-executable instructions or data structures stored thereon. Computer-executable instructions comprise, for example, instructions and data which cause a general purpose computer, special purpose computer, or special purpose processing device to perform a certain function or group of functions.

The computer-readable media carrying the computer-executable instructions can be any available media that can be accessed by a general purpose or special purpose computer. By way of example, and not limitation, such computer-readable media can comprise computer-readable storage media, such as, but not limited to RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-readable media can also include computer-readable transmission media. For example, when information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. In a computing environment, a computer storage device storing a hyperspace index for indexing identifiers, wherein the identifiers correspond to parameter patterns, and wherein the presence of an identifier in the hyperspace index indicates that the corresponding parameter pattern may be present in a set of parameter patterns, and wherein absence of the indicator in the hyperspace index indicates that the corresponding parameter pattern is not present in the set of parameter patterns, the hyperspace index comprising:

a top level index representing a set of parameter patterns that may appear in one or more data sources front ended by the hyperspace index, each parameter pattern in the set of parameter patterns mapping to an identifier and wherein at least some of the parameter patterns map to the same identifier as another parameter pattern, wherein the top level index comprises a plurality of binary bits, wherein each binary bit corresponds to one of the identifiers, wherein a binary bit being set indicates that at least one of the parameter patterns that map to the identifier is present in the one or more data sources;

a plurality of lower level indexes, each lower level index comprising:

an index hierarchically below another index in the hierarchy, wherein each lower level index represents a subset of the parameter patterns represented by the other index above the lower level index in the hierarchy, each parameter pattern represented by the lower level index mapping to an identifier and wherein the lower level index comprises a plurality of binary bits, wherein each binary bit corresponds to one of the identifiers, wherein a binary bit being set indicates that one or more of the parameter patterns represented by the lower level index that map to the identifier is present in the one or more data sources.

2. The computer storage device of claim 1, wherein identifiers are derived from a calculated hash of a corresponding parameter pattern.

3. The computer storage device of claim 1, wherein the identifiers in each lower level index and the identifiers in the top level abbreviated index are derived using the same algorithm.

4. The computer storage device of claim 1, wherein parameter patterns comprise search specifiers.

5. The computer storage device of claim 4, wherein the search specifiers comprise Boolean combinations of search terms.

6. The computer storage device of claim 4, wherein the search specifiers comprise at least one of a question or an answer.

7. The computer storage device of claim 1, wherein the parameter patterns further comprise ranking information combined with search specifiers.

8. The computer storage device of claim 7, wherein the ranking information includes personalized ranking through customized criteria.

9. The computer storage device of claim 1, wherein the parameter patterns include an ordering according to a priority.

10. The computer storage device of claim 1, wherein the parameter patterns further comprise ranking information combined with search terms, wherein the ranking information includes at least one of user preference ranking, job appropriate ranking, profession appropriate ranking, linguistic appropriate ranking, stylistic appropriate ranking, and ranking based on previous searches.

11. The computer storage device of claim 1, wherein the indexes are organized into hierarchical threads according to a ranking such that referencing of the data hyperspace index for identifier entries can be accomplished by following higher ranked hierarchical threads first.

12. The computer storage device of claim 11, wherein the indexes are organized such that indexes beyond a given threshold are not relevant.

13. The computer storage device of claim 1, wherein the lower level indexes are sized with a selected granularity to set a level of search resolution.

14. The computer storage device of claim 1, wherein which parameter patterns are included in a subset of parameter patterns represented by each lower level index is based on characteristics of objects represented in the lower level index.

15. The computer storage device of claim 1, wherein the identifiers in each index comprise a number of bits from a hash of the corresponding parameter pattern.

16. The computer storage device of claim 15, wherein the identifiers in a lower level index comprise a lesser number of bits from the hash of the corresponding parameter pattern than the number of bits from the hash of the corresponding parameter used for the identifiers in an index hierarchically above the lower level index.

17. The computer storage device of claim 1, wherein at least some of the identifiers in a particular index include a frequency pointer that indicates the number of indicators for the parameter pattern in indexes hierarchically below the particular index.

18. The computer storage device of claim 1, wherein at least some of the identifiers in a particular index include one or more child index pointers that indicate which lower level indexes below the particular index include one or more identifiers for the corresponding parameter pattern.

19. The computer storage device of claim 1, wherein at least some of the identifiers in a particular index a short circuit pointer which allows for lower level indexes to be bypassed such that a search can be focused to a particular location or record of a data space.

20. The computer storage device of claim 1, wherein the top level index and the plurality of lower level indexes are a combination of abbreviated indexes, indexes of small records accessed by an identifier number as a key, and full text indexes.

21. The computer storage device of claim 1, wherein lower level indexes at the bottom of the hierarchy comprise at least one of records or documents ordered from high to low relevance in the fields.

22. The computer storage device of claim 21, wherein relevance is determined by at least one of general reliability or relevance, or static reliability or relevance.

23. The computer storage device of claim 1, wherein lower level indexes at the bottom of the hierarchy are distributed according to relevance in proportions across a set of multiple clusters of servers.

24. In a computing environment including at least one processor and at least one computer storage device, a method performed by the at least one processor for indexing identifiers into a hyperspace index, wherein the identifiers correspond to parameter patterns, and wherein the presence of an identifier in the hyperspace index indicates that the corresponding parameter pattern may be present in a set of parameter patterns, and wherein absence of the indicator in the hyperspace index indicates that the corresponding parameter pattern is not present in the set of parameter patterns, the method comprising:

creating, in the at least one computer storage device, a top level index comprising a plurality of identifiers for representing a set of parameter patterns that may appear in one or more data sources front ended by the hyperspace index, wherein the top level index comprises a plurality of binary bits, each bit being associated with an identifier, creating the top level index including:

for each parameter pattern in the set of parameter patterns, mapping the parameter pattern to an identifier and wherein at least some of the parameter patterns map to the same identifier as another parameter pattern; and for each identifier that a parameter pattern was mapped to, setting the corresponding binary bit in the top level index such that a binary bit being set indicates that at least one of the parameter patterns that map to the identifier may be present in the one or more data sources; and creating, in the at least one computer storage device, a plurality of lower level indexes, each lower level index comprising an index hierarchically below another index in the hierarchy, each lower level index comprising a plurality of identifiers for representing a subset of the parameter patterns represented by the other index above the lower level index in the hierarchy, wherein each lower level index comprises a plurality of binary bits, each bit being associated with an identifier, creating each lower level index comprising:

for each parameter pattern in the subset of parameter patterns, mapping the parameter pattern to an identifier; and for each identifier that a parameter pattern was mapped to, setting the corresponding binary bit in the lower level index such that a binary bit being set indicates that one or more of the parameter patterns represented by the lower level index that map to the identifier is present in the one or more data sources.

25. The method of claim 24, wherein mapping the parameter pattern to an identifier comprises creating a hash of the parameter pattern and using a portion of the hash as the identifier for the pattern parameter.

26. The method of claim 24, wherein one of the parameter patterns is a parameter pattern for a data object, the method further comprising:

including additional identifiers for additional parameter patterns for the data object in the top level index and one or more of the lower level indexes.

27. The method of claim 26, further comprising allocating memory for the top level index and the one or more of the lower level indexes based on the number of data objects, the number of parameter patterns for each data object, and one or more multipliers.

28. The method of claim 27, wherein allocating memory is done for each index individually based on the number of data objects, the number of parameter patterns for each data object, and a multiplier, for each index.

29. The method of claim 24, further comprising organizing a hierarchical arrangement of indexes by priority.

* * * * *